United States Patent
Ozcan et al.

(10) Patent No.: US 11,054,357 B2
(45) Date of Patent: Jul. 6, 2021

(54) MOBILE MICROSCOPY SYSTEM FOR AIR QUALITY MONITORING

(71) Applicant: THE REGENTS OF THE UNIVERSITY OF CALIFORNIA, Oakland, CA (US)

(72) Inventors: Aydogan Ozcan, Los Angeles, CA (US); Yichen Wu, Los Angeles, CA (US); Steve Wei Feng, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 16/492,098

(22) PCT Filed: Mar. 9, 2018

(86) PCT No.: PCT/US2018/021813
§ 371 (c)(1),
(2) Date: Sep. 6, 2019

(87) PCT Pub. No.: WO2018/165590
PCT Pub. Date: Sep. 13, 2018

(65) Prior Publication Data
US 2020/0103328 A1 Apr. 2, 2020

Related U.S. Application Data

(60) Provisional application No. 62/469,700, filed on Mar. 10, 2017.

(51) Int. Cl.
*G01N 15/00* (2006.01)
*G01N 15/02* (2006.01)
(Continued)

(52) U.S. Cl.
CPC ..... *G01N 15/0227* (2013.01); *G01N 15/0255* (2013.01); *G01N 15/0612* (2013.01);
(Continued)

(58) Field of Classification Search
CPC .......... G01N 15/0227; G01N 15/0255; G01N 15/0612; G01N 15/1434
See application file for complete search history.

(56) References Cited

U.S. PATENT DOCUMENTS 5,090,233 A * 2/1992 Kogure ............. G01N 15/0255
73/28.05
5,435,043 A 7/1995 Ito et al.
(Continued)

FOREIGN PATENT DOCUMENTS

WO WO 2016/039722 3/2016

OTHER PUBLICATIONS

PCT International Preliminary Report on Patentability (Chapter I of the Patent Cooperation Treaty) for PCT/US2018/021813, Applicant: The Regents of the University of California, Form PCT/IB/326 and 373, dated Sep. 19, 2019 (6pages).
(Continued)

*Primary Examiner* — Jonathan M Hansen
(74) *Attorney, Agent, or Firm* — Vista IP Law Group LLP

(57) ABSTRACT

A lens-free microscope for monitoring air quality includes a housing that contains a vacuum pump configured to draw air into an impaction nozzle. The impaction nozzle has an output located adjacent to an optically transparent substrate for collecting particles. One or more illumination sources are disposed in the housing and are configured to illuminate the collected particles on the optically transparent substrate. An image sensor is located adjacent to the optically transparent substrate, wherein the image sensor collects particle diffraction patterns or holographic images cast upon the image
(Continued)

sensor. At least one processor is disposed in the housing and controls the vacuum pump and the one or more illumination sources. Image files are transferred to a separate computing device for image processing using machine learning to identify particles and perform data analysis to output particle images, particle size, particle density, and/or particle type data.

15 Claims, 16 Drawing Sheets

(51) Int. Cl.
    *G01N 15/06*       (2006.01)
    *G01N 15/14*       (2006.01)

(52) U.S. Cl.
    CPC . *G01N 15/1434* (2013.01); *G01N 2015/0046* (2013.01); *G01N 2015/0233* (2013.01); *G01N 2015/144* (2013.01); *G01N 2015/1454* (2013.01); *G01N 2015/1488* (2013.01); *G01N 2015/1493* (2013.01)

(56) References Cited

U.S. PATENT DOCUMENTS

| | | | |
|---|---|---|---|
| 6,435,043 | B1 | 8/2002 | Ferguson et al. |
| 2001/0029793 | A1 | 10/2001 | Moler et al. |
| 2012/0148141 | A1 | 6/2012 | Ozcan et al. |
| 2012/0157160 | A1 | 6/2012 | Ozcan et al. |
| 2012/0218379 | A1 | 8/2012 | Ozcan et al. |
| 2012/0248292 | A1 | 10/2012 | Ozcan et al. |
| 2012/0281899 | A1 | 11/2012 | Ozcan et al. |
| 2013/0027540 | A1 | 1/2013 | Ito |
| 2013/0092821 | A1 | 4/2013 | Ozcan et al. |
| 2013/0157351 | A1 | 6/2013 | Ozcan et al. |
| 2013/0193544 | A1 | 8/2013 | Ozcan et al. |
| 2013/0203043 | A1 | 8/2013 | Ozcan et al. |
| 2013/0258091 | A1 | 10/2013 | Ozcan et al. |
| 2013/0280752 | A1 | 10/2013 | Ozcan et al. |
| 2014/0120563 | A1 | 5/2014 | Ozcan et al. |
| 2014/0160236 | A1 | 6/2014 | Ozcan et al. |
| 2014/0300696 | A1 | 10/2014 | Ozcan et al. |
| 2015/0111201 | A1 | 4/2015 | Ozcan et al. |
| 2015/0153558 | A1 | 6/2015 | Ozcan et al. |
| 2015/0204773 | A1 | 7/2015 | Ozcan et al. |
| 2016/0069801 | A1* | 3/2016 | Stevens ............... H04N 5/2253 348/135 |
| 2016/0070092 | A1 | 3/2016 | Ozcan et al. |
| 2016/0161409 | A1 | 6/2016 | Ozcan et al. |
| 2016/0202163 | A1* | 7/2016 | Weissleder ....... G01N 33/56972 506/9 |
| 2016/0327473 | A1 | 11/2016 | Ozcan et al. |
| 2016/0334614 | A1 | 11/2016 | Ozcan et al. |

OTHER PUBLICATIONS

The extended European search report dated Jan. 23, 2020 in European Patent Application No. 18763450.6 r9pages).
Communication pursuant to Rules 70(2) and 70a(2) EPC dated Feb. 11, 2020 in European Patent Application No. 18763450.6 (1page).
PCT International Search Report for PCT/US2018/021813, Applicant: The Regents of the University of California, Form PCT/ISA/210 and 220, dated Jun. 1, 2018 (3pages).
PCT Written Opinion of the International Search Authority for PCT/US2018/021813, Applicant: The Regents of the University of California, Form PCT/ISA/237, dated Jun. 1, 2018 (4pages).
Bishara, W. et al., Lensfree on-chip microscopy over a wide field-of-view using pixel super-resolution, May 24, 2010, vol. 18, No. 11, Optics Express, 11181-11191.
Ozcan, A. et al., c-Air, vodafone-us.com/wireless-innovation-project/past-competitions/2016/2016-winners/c-air/, https://www.printfriendly.com/p/g/e4XtY7; printed: Sep. 4, 2019 (4pages).
Fluke 985 Particle Counter, Technical Data, Fluke (2012) (2pages).
Gonzalez, R. et al., Digital Image Processing Using MATLAB Second Edition, Gatesmark Publishing (2009) (40pages).
Greenbaum, A. et al., Imaging without lenses: achievements and remaining challenges of wide-field on-chip microscopy, Nat Methods. Sep. 2012; 9(9): 889-895. doi:10.1038/nmeth.2114.
Greenbaum, A. et al., Increased space-bandwidth product in pixel super-resolved lensfree on-chip microscopy, Scientific Reports, 3:1717; DOI:10.1038/srep01717.
Liu, C. et al., Transparent air filter for high-efficiency PM2.5 capture, Nature Communications, 6:6205, DOI: 10.1038/ncomms7205 |www.nature.com/naturecommunications.
McLeod, E. et al., High-Throughput and Label-Free Single Nanoparticle Sizing Based on Time-Resolved On-Chip Microscopy, ACSNano, vol. 9, No. 3,3265-3273, www.acsnano.org (2015).
Model 804 Manual, Met One Instruments, Inc. (2007) (19pages).
Hand-held Condensation Particle Counter Model 3007, TSI Incorporated, www.tsi.com (2012) (2pages).
Mudanyali, O. et al., Compact, Light-weight and Cost-effective Microscope based on Lensless Incoherent Holography for Telemedicine Applications, Lab Chip. Jun. 7, 2010; 10(11): 1417-1428, doi:10.1039/c000453g.
Ozcan, A., UCLA Newsroom Release, Two UCLA researchers win 2016 Vodafone Wireless Innovation prizes (3pages).
Walton, W.H. et al., Aerosol Instrumentation in Occupational Hygiene: An Historical Perspective, Aerosol Science and Technology, 28:417-438 (1998).
Wu, Y. et al., Demosaiced pixel super-resolution for multiplexed holographic color imaging, Scientific Report, 6:28601, DOI:10.1038/srep28601.
Response to the extended European search report dated Nov. 17, 2020 in European Patent Application No. 18763450.6 (81 pages).

\* cited by examiner (i)  (ii)  (iii)

(iv)  (v)  (vi)

MOBILE MICROSCOPY SYSTEM FOR AIR QUALITY MONITORING

RELATED APPLICATION

This Application is a U.S. National Stage filing under 35 U.S.C. § 371 of International Application No. PCT/US2018/021813, filed Mar. 9, 2018, which claims priority to U.S. Provisional Patent Application No. 62/469,700 filed on Mar. 10, 2017, which are hereby incorporated by reference. Priority is claimed pursuant to 35 U.S.C. §§ 119, 371 and any other applicable statute.

STATEMENT REGARDING FEDERALLY SPONSORED RESEARCH AND DEVELOPMENT

This invention was made with government support under Grant Number 1533983, awarded by the National Science Foundation. The government has certain rights in the invention.

TECHNICAL FIELD

The technical field generally relates to air quality monitoring devices. In particular, the technical field of the invention relates to portable, lens-free microscopy system that is used for high-throughput quantification of particular matter (PM).

BACKGROUND

Air quality is an increasing concern in the industrialized world. According to the World Health Organization (WHO), air pollution causes two million deaths annually in China, India, and Pakistan. Moreover, "premature death" of seven million people worldwide each year is estimated due to the health hazards of air pollution. More recently, several severe incidents of pollution haze afflicted Beijing, China and certain cities in India and attracted worldwide attention. Particulate matter (PM) is a mixture of solid and liquid particles in air and forms a significant form of air pollution. PM sources include both mobile and stationary sources. PM is generated by direct emissions from a source, such as a construction site, smokestack, or fire, or a result of complex chemical reactions emitted from power plants, industrial production, and automobiles. PM with a general diameter of 10 μm and smaller, which is termed PM10, can cause serious health problems. A smaller PM size category, PM2.5, which represents particles with a diameter of 2.5 μm or smaller can become lodged deep within the lungs and even enter the bloodstream and has been declared a cause of cancer by the WHO. Furthermore, PM is a major environmental issue on account of reduced visibility (haze). PM may be generated from indoor sources as well. Indoor PM can be generated through cooking, combustion activities, computer printers, and other sources. Monitoring PM air quality as a function of space and time is critical for understanding the effects of industrial and other pollution generating activities, studying atmospheric models, and providing regulatory and advisory guidelines for transportation, residents, and industries.

Currently, PM monitoring is performed at designated air sampling stations, which are regulated by the US Environmental Protection Agency (EPA) or other localized agencies such as the South Coast Air Management District (SCAQMD) in California. Similar agencies in other countries and regions monitor PM levels. Many of these advanced automatic platforms use either beta-attenuation monitoring (BAM) or a tapered element oscillating microbalance (TEOM) instrument. BAM instruments sample aerosols on a rotating filter. Using a beta-particle source, they measure the beta-particle attenuation induced by the accumulated aerosols on the filter. TEOM-based instruments, on the other hand, capture aerosols in a filter cartridge, which contains a glass tube tip that vibrates at varying frequencies according to the mass of the captured aerosols. These devices provide accurate PM measurements at high throughputs. However, these instruments are cumbersome and heavy (~30 kg), relatively expensive (~$50,000-100,000), and require specialized personnel or technicians for regular system maintenance, e.g., every few weeks. Due to these limitations, only approximately 10,000 of these air sampling stations exist worldwide.

In addition to the high-end PM measurement instruments discussed above, several commercially available portable particle counters are available at a lower cost of approximately $2,000 (e.g., 804 Handheld Particle Counter, available from Met One Instrument, Inc.) and in some cases much higher, $7,000-8,000 (Model 3007 hand-held particle counter, available from TSI, Inc.). These commercially available optical particle counters resemble a flow-cytometer. They drive the sampled air through a small channel. A laser beam focused on the nozzle of this channel is scattered by each particle that passes through the channel. The scattering intensity is then used to infer the particle size. Because of its serial read-out nature, the sampling rate of this approach is limited to <2-3 L/min and in some sub-micron particle detection schemes <0.8 L/min. Furthermore, accurate measurement of either very high or very low concentrations of particles is challenging for these devices, which limits the dynamic range of the PM measurement. In addition to these limitations, the scattering cross-section, which comprises the quantity actually measured by this device type, heavily depends on the 3D morphology and refractive properties of the particles. This can cause severe errors in the conversion of the measured scattered light intensities into actual particle sizes. Finally, none of these designs offers a direct measure, i.e., a microscopic image of the captured particles, which is another limitation because further analysis of a target particle of interest after its detection cannot be performed.

Due to these limitations, many air sampling activities continue to use microscopic inspection and counting. Basically, air samples are manually obtained in the field using a portable sampler that employs various processes, such as cyclonic collection, impingement, impaction, thermophoresis, or filtering. The sample is then sent to a separate, central laboratory, where it is post-processed and manually inspected under a microscope by an expert. This type of microscopic analysis provides the major advantage of more accurate particle sizing, while enabling the expert reader to recognize the particle shape and type. These capabilities yield additional benefits in more complicated analyses of air pollution, such as identification of a specific aerosol type. In this method, however, the sampling and inspection processes are separated; i.e., the sampling is performed in the field, whereas the sample analysis is conducted in a remote professional laboratory. This significantly delays the reporting of the results since the PM containing substrates need to be delivered to the remotely located laboratory. Furthermore, the inspection is manually performed by a trained expert, which considerably increases the overall cost of each air-quality measurement. Furthermore, this conventional microscope-based screening of aerosols cannot be conducted in the field, because these benchtop microscopes are cumbersome, heavy, expensive, and require specialized skills to operate.

SUMMARY

In one embodiment, a hand-held and cost-effective mobile platform is disclosed that offers a transformative solution to the above-outlined limitations of existing air quality measurement techniques. The hand-held mobile platform, in one embodiment, automatically outputs size data and/or size statistics regarding captured PM using computational lens-free microscopy and machine learning. The hand-held mobile platform is amenable to high-throughput quantification of PM. As an alternative to conventional lens-based microscopy techniques, in a computational lens-free microscopy approach, the sample is directly positioned on top of or immediately adjacent to an image sensor (e.g., image sensor chip) with no optical components being located between them. Such an on-chip microscope can rapidly reconstruct images of transmissive samples over a very large field of view of >20 mm$^2$. The computational on-chip imaging is paired with a unique machine learning enabled particle analysis method to create a lightweight (~590 g), hand-held and cost-effective air-quality monitoring system, which is sometimes referred to herein as "c-Air."

In one embodiment, this mobile system utilizes a vacuum pump, an impaction-based air-sampler, and a lens-free holographic on-chip microscope that is integrated with a custom-written machine learning algorithm for off-chip or remote data processing and particle analysis. The c-Air platform may operate, in one embodiment, with a Smartphone application (e.g., application or "app") for device control and data display. Air samples taken with the c-Air platform may be tagged with GPS coordinates and time for spatio-temporal tracking of results. It can rapidly screen 6.5 L of air volume in 30 seconds, generating microscopic phase and/or amplitude images of the captured particles, while also automatically providing the PM sizing distribution with a sizing accuracy of ~93%.

By measuring the air quality using the c-Air platform over several hours at an EPA-approved air-quality monitoring station, it was confirmed that the c-Air PM measurements closely matched those of an EPA-approved BAM device. The c-Air platform was further tested in various indoor and outdoor locations in California. In some of these experiments, a significant increase in ambient PM caused by the 2016 "Sand Fire" near Santa Clarita, Calif. was detected using the c-Air platform. Finally, a 24-h spatio-temporal mapping of air pollution near Los Angeles International Airport (LAX) was performed using the c-Air devices. The results revealed the occurrence of a temporal modulation of PM that correlates with the total number of flights at LAX. This modulation was present even at a distance of >7 km from LAX along the direction of landing flights. Because c-Air is based on computational microscopic imaging and machine learning, it can adaptively learn and potentially be tailored to sensitively recognize specific sub-groups or classes of particles, including various types of pollen, mold, and industrial emissions based on their phase and/or amplitude images, created by lens-free holographic imaging. The c-Air platform and its unique capabilities are broadly applicable to numerous air-quality-related applications, and it can provide cost-effective, compact, and mobile solutions for spatio-temporal mapping of both indoor and outdoor air quality.

In one embodiment, a portable, lens-free microscope device for monitoring air quality includes a housing and a vacuum pump configured to draw air into an impaction nozzle disposed in the housing, the impaction nozzle having an output located adjacent to an optically transparent substrate for collecting particles contained in the air. The device includes one or more illumination sources disposed in the housing and configured to illuminate the collected particles on the optically transparent substrate. An image sensor is disposed in the housing and located adjacent to the optically transparent substrate at a distance of less than 5 mm, wherein the image sensor collects diffraction patterns or holographic images cast upon the image sensor by the collected particles. At least one processor is disposed in the housing, the at least one processor controlling the vacuum pump and the one or more illumination sources.

In another embodiment, a system is provided that includes the portable, lens-free microscope device for monitoring air quality described above. The system further includes a computing device configured to execute software thereon for receiving a diffraction patterns or holographic images from the image sensor and reconstructing differential holographic images (containing amplitude and/or phase information of the particles) and outputting one or more of particle images, particle size data, particle density data, particle type data of the collected particles. The system further includes a portable electronic device containing software or an application thereon configured to receive the particle size data, particle density data, and/or particle type data of the collected particles and output the same to the user on a user interface.

In one embodiment, the computing device outputs particle size data, particle density data, and/or particle type data based on a machine learning algorithm in the software using extracted spectral and spatial features comprising one or more of minimum intensity ($I_m$), average intensity ($I_a$), maximum intensity, standard deviation of intensity, area (A), maximum phase, minimum phase, average phase, standard deviation of phase, eccentricity of intensity, and eccentricity of phase.

In another embodiment, a method of monitoring air quality using a portable microscope device includes the operations of activating a vacuum pump disposed in the portable microscope device to capture aerosol particles on an optically transparent substrate (e.g., cover slip or the like). The optically transparent substrate that contains the captured aerosol particles is illuminated with one or more illumination sources contained in the portable microscope device. These may be, for example, light emitting diodes (LEDs) of different colors. An image sensor located adjacent to the optically transparent substrate in the portable microscope device captures before and after (with respect to capturing aerosol particles in a particular run) holographic images or diffraction patterns of the captured aerosol particles. The image files containing the holographic images or diffraction patterns are transferred to a computing device. The image files containing the before and after holographic images or diffraction patterns are then subject to image processing with software contained on the computing device to generate a differential hologram or diffraction pattern followed by outputting one or more of holographic reconstruction images and particle size data, particle density data, and/or particle type data of the captured aerosol particles. The outputted particle images, particle size data, particle density, and/or particle type data may be transferred to a portable electronic device for viewing by the user.

DETAILED DESCRIPTION OF THE ILLUSTRATED EMBODIMENTS

Figure 1:
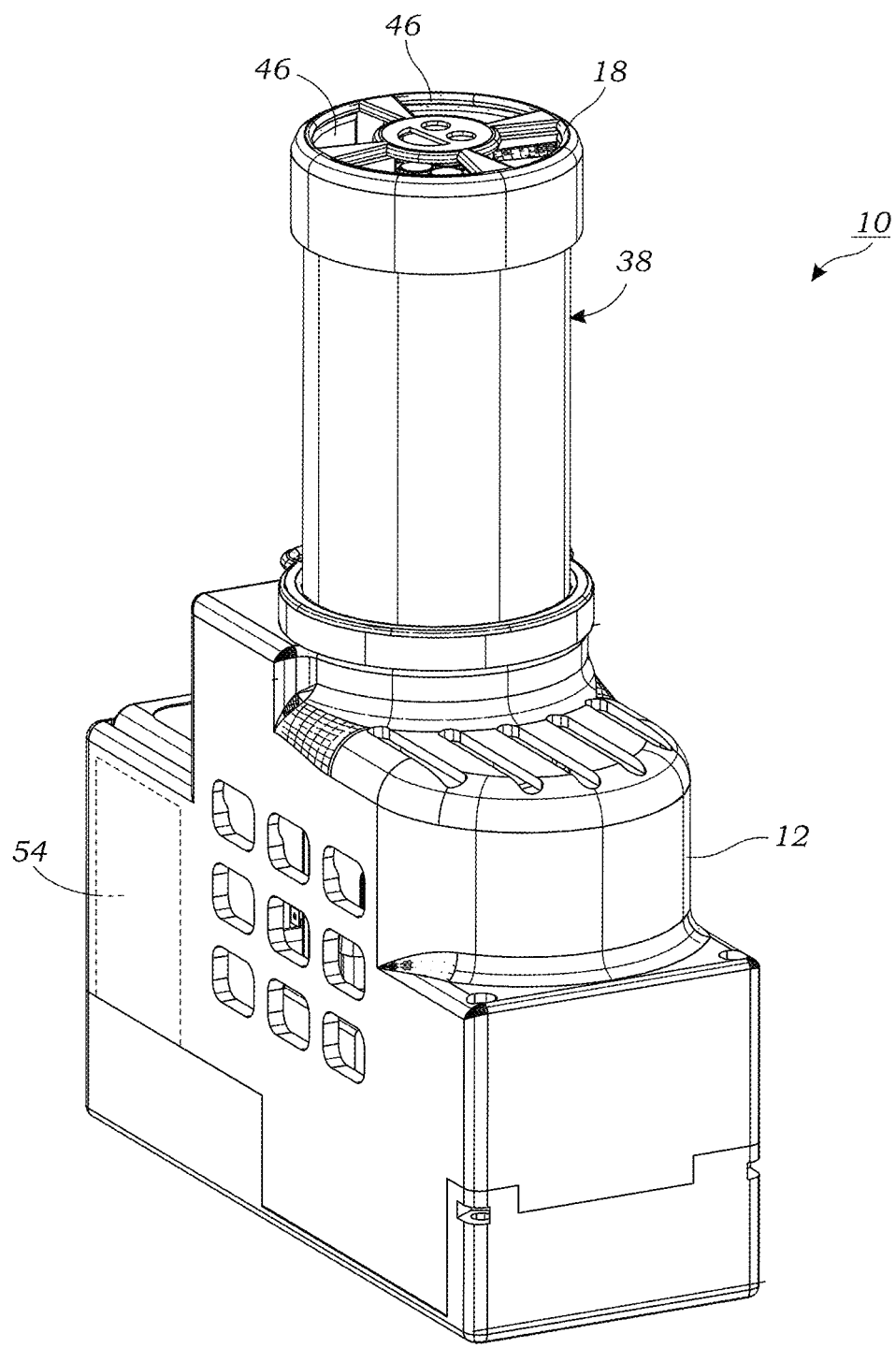
FIG. 1 illustrates a perspective view of the lens-free microscope device according to one embodiment.
Figure 2:
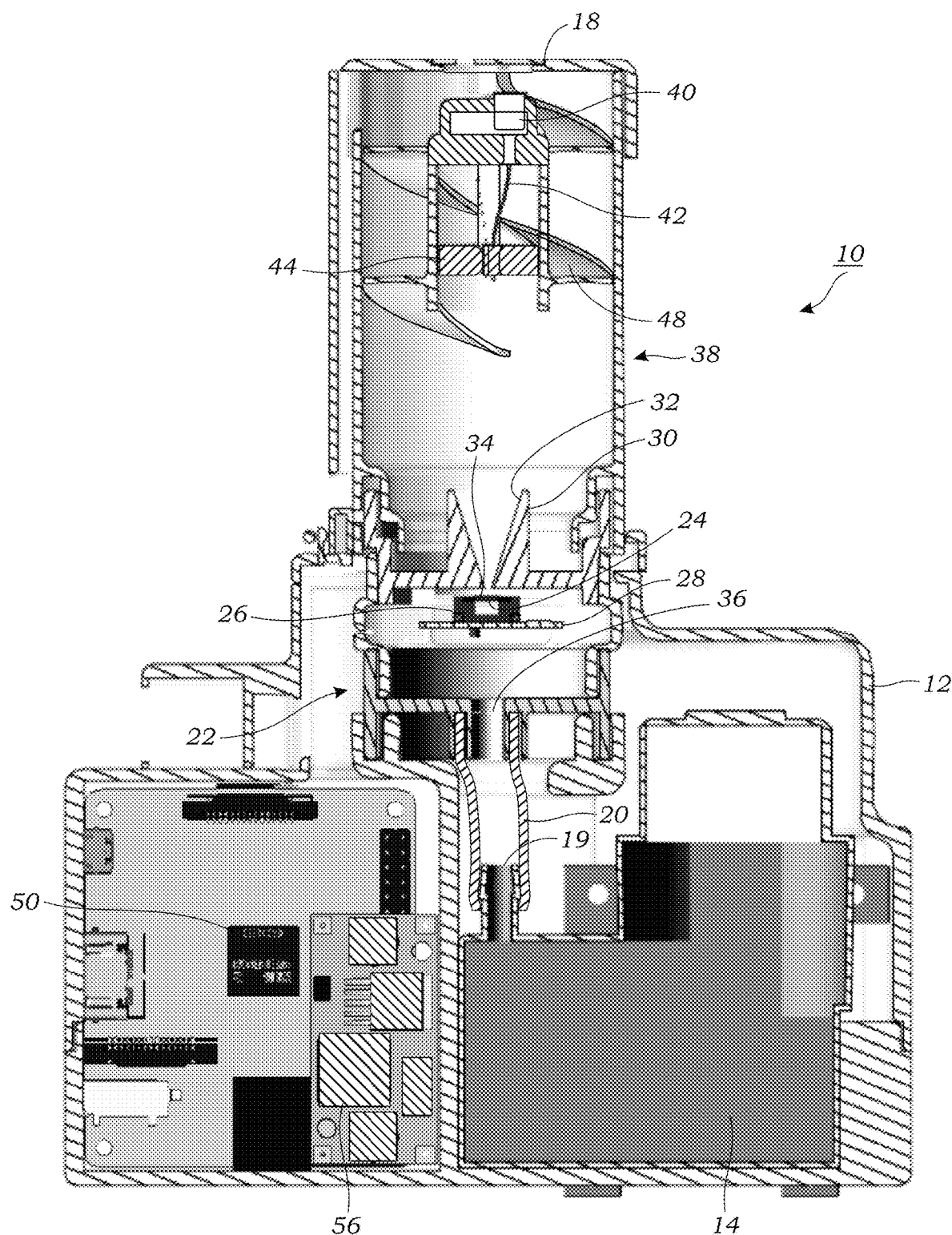
FIG. 2 illustrates a cross-sectional view of the lens-free microscope device of FIG. 1.

FIGS. 1 and 2 illustrate a lens-free microscope device 10 that is used for monitoring air quality. The lens-free microscope device 10 is advantageously a hand-held portable device that may be easily transported and used at various locations. The lens-free microscope device 10 is lightweight, weighing less than about 1.5 pounds in some embodiments. The lens-free microscope device 10 includes a housing 12 that holds the various components of the lens-free microscope device 10. The housing 12 may be made of a rigid polymer or plastic material, although other materials (e.g., metals or metallic materials) may be used as well. As best seen in FIG. 2, a vacuum pump 14 is located within the housing 12. The vacuum pump 14 is configured to draw air into an inlet 18 (best seen in FIG. 1) located in an extension portion 38 of the housing 12. An example of a commercially available vacuum pump 14 that is usable with the lens-free microscope device 10 includes the Micro 13 vacuum pump (Part No. M00198) available from Gtek Automation, Lake Forrest, Calif. which is capable of pumping air at a rate of thirteen (13) liters per minute. Of course, other vacuum pumps 14 may be used. The vacuum pump 14 includes a nipple or port 19 (FIG. 2) that is used as the inlet to the vacuum pump 14. A corresponding nipple or port (no illustrated) located on the vacuum pump 14 is used for exhaust air from the vacuum pump 14. The inlet nipple or port 19 is coupled to segment of tubing 20 as seen in FIG. 2 that is connected to an air sampler assembly 22 (FIG. 2).

Figure 3:
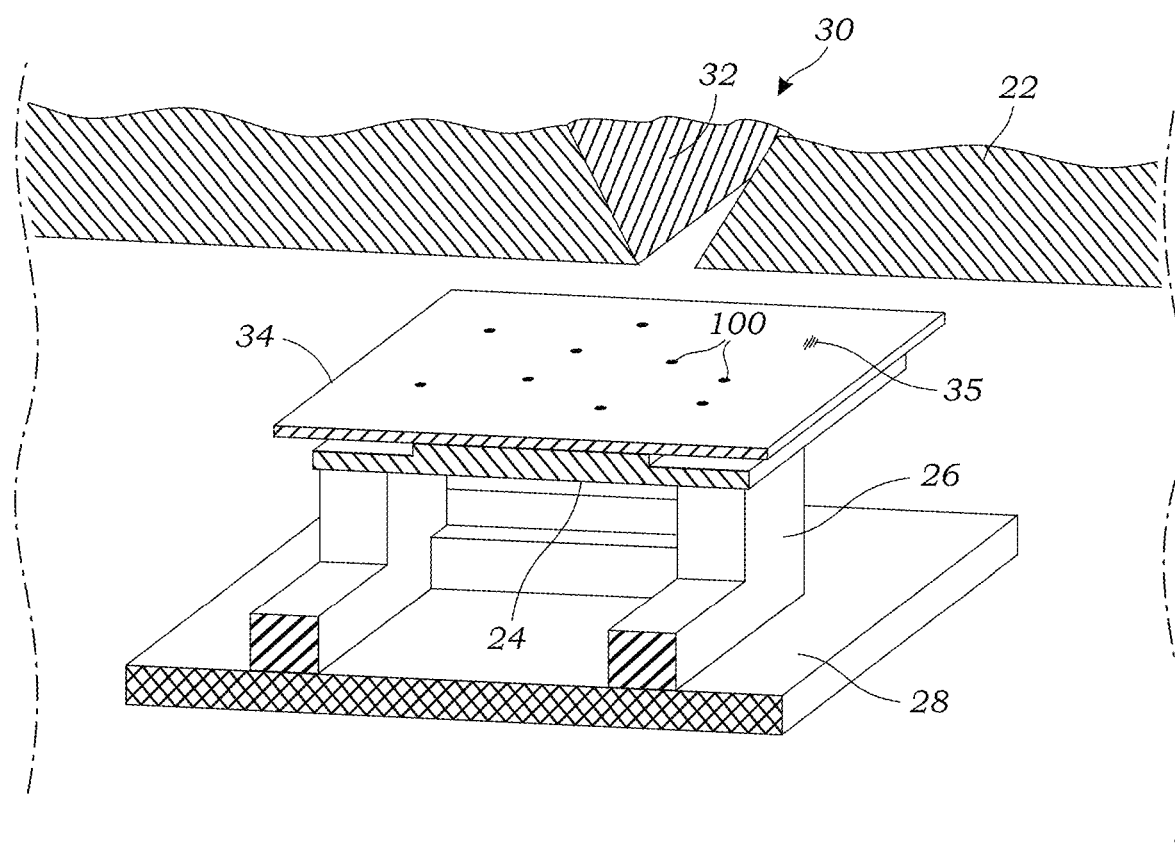
FIG. 3 illustrates a close-up perspective view the output of the impaction nozzle and the image sensor that is located on a support that is positioned atop a printed circuit board (PCB).
Figure 4:
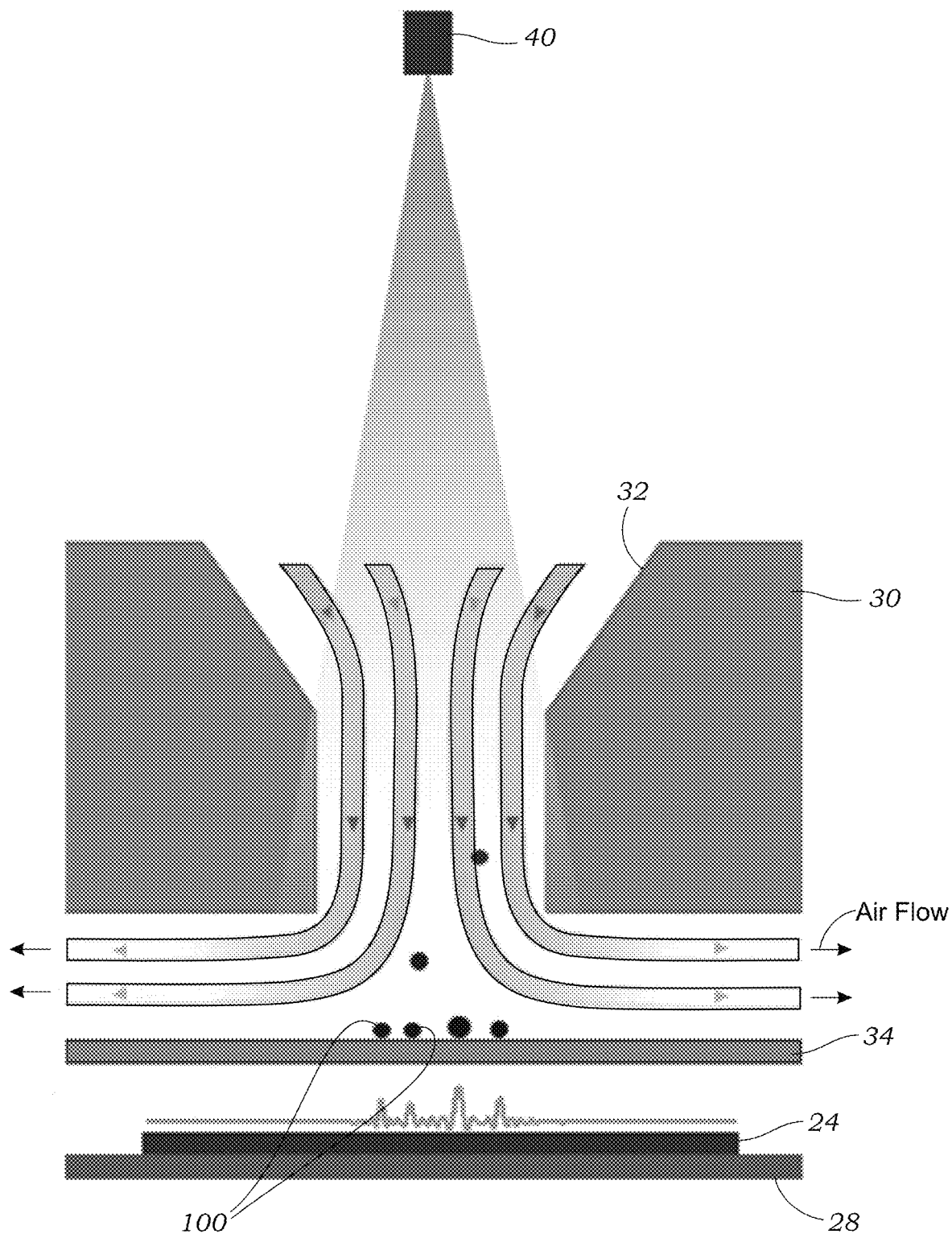
FIG. 4 schematically illustrates airflow containing particles passing through the impaction nozzle. Particles are captured on the optically transparent substrate and imaged using the image sensor. Arrows indicated direction of airflow.

The air sampler assembly 22 contains an image sensor 24 (seen in FIGS. 2, 3, 4) that is used to obtain holographic images or diffraction patterns on particles that are collected as explained herein. The image sensor 24 may include, for example, a color CMOS image sensor but it should be appreciated that other image sensor types may be used. In experiments described herein, a color CMOS sensor with a 1.4 µm pixel size was used although even smaller pixel sizes may be used to improve the resolution of the lens-free microscope device 10. The image sensor 24 is located on a support 26 that is positioned atop a printed circuit board (PCB) 28 that contains operating circuitry for the image sensor 24.

The air sampler assembly 22 further includes an impaction nozzle 30 that is used to trap or collect aerosol particles that are sampled from the sample airstream that is pumped through the microscope device 10 using the vacuum pump 14. The impaction nozzle 30 includes a tapered flow path 32 that drives the airstream through the impaction nozzle 30 at high speed. The tapered flow path 32 terminates in a narrow opening (e.g., rectangular shaped) through which the air passes. The impaction nozzle 30 further includes an optically transparent substrate 34 (best seen in FIGS. 3 and 4) that is disposed adjacent to the narrow opening of the tapered flow path 32 (seen in FIG. 3). The optically transparent substrate 34 includes a sticky or tacky material 35 (e.g., collection media) on the side facing the output of the tapered flow path 32. Thus, the optically transparent substrate 34 with the sticky or tacky material 35 is placed to directly face the high velocity airstream that passes through the impaction nozzle 30. The particles 100 (seen in FIGS. 3 and 4) contained within the airstream impact the optically transparent substrate 34 and are collected or trapped on the surface of the optically transparent substrate 34 for imaging. The airstream continues around the sides of the optically transparent substrate 34 (as seen by arrows in FIG. 4) where it exits via an orifice 36 as seen in FIG. 2 that connects to tubing 20. In one embodiment, the impaction nozzle 30 is formed using the upper cassette portion of the commercially available Air-O-Cell® Sampling Cassette from Zefon International, Inc. The upper cassette portion of the Air-O-Cell® Sampling Cassette includes the tapered flow path 32 as well as a coverslip (e.g., optically transparent substrate 34) containing collection media.

The optically transparent substrate 34 is located immediately adjacent to the image sensor 24. That is to say the airstream-facing surface of the optically transparent substrate 34 is located less than about 5 mm from the active surface of the image sensor 24 in some embodiments. In other embodiments, the facing surface of the optically transparent substrate 34 is located less than 4 mm, 3 mm, 2 mm, and in a preferred embodiment, less than 1 mm. In one embodiment, the optically transparent substrate 34 is placed directly on the surface of the image sensor 24 to create a distance of around 400 µm between the particle-containing surface of the optically transparent substrate 34 and the active surface of the image sensor 24. The particle-containing surface of the optically transparent substrate 34 is also located close to the impaction nozzle 30, for example, around 800 µm in one embodiment. Of course, other distances could be used provided that holographic images and/or diffraction patterns of captured particles 100 can still be obtained with the sensor.

Referring to FIGS. 1 and 2, the housing 12 of the lens-free microscope device 10 includes an extension portion 38 that houses one or more illumination sources 40. In one embodiment, one or more light emitting diodes (LEDs) are used for the one or more illumination sources 40. Laser diodes may also be used for the illumination sources 40. Each LED 40 is coupled to an optical fiber 42 that terminates in a header 44 for illuminating the optically transparent substrate 34. The fiber-coupled LEDs 40 generate partially coherent light that travels along an optical path from the end of the optical fiber(s) 42 through the tapered flow path 32 and onto the optically transparent substrate 34. The ends of the optical fibers 42 are located several centimeters away from the active surface of the image sensor 24 (e.g., 8 cm). As an alternative to optical fibers 42 and aperture formed in the header 44 may be used to illuminate the optically transparent substrate 34 with partially coherent light. In one embodiment, each LED 40 has a center wavelength or range that is of a different color (e.g., red, green, blue). While multiple LEDs 40 are illustrated it should be appreciated that in other embodiments, only a single LED 40 may be needed. Using LED illumination, the aerosol samples, which were captured by the collection media on the optically transparent substrate 34, cast in-line holograms or diffraction patterns that are captured by the image sensor 24. These holograms or diffraction patterns are recorded by the image sensor 24 for holographic reconstruction and further processing to determine the particulate matter (PM) statistics as explained herein. Due to the close proximity of the particles 100 to the active surface of the image sensor 24, both the spatial and temporal coherence of the source could be partial, thereby eliminating the need for laser-based illumination. As seen in FIG. 1, air that is to be tested or sampled by the lens-free microscope device 10 enters through openings 46 located at the end of the extension portion 38 of the housing 12 that function as the inlet 18. A spiraled inner surface 48 as seen in FIG. 2 is formed in the interior of the extension portion 38 to limit ambient light from reaching the image sensor 24.

The lens-free microscope device 10 includes one or more processors 50 contained within the housing 12 which are configured to control the vacuum pump 14 and the one or more illumination sources 40 (e.g., LED driver circuitry). In the embodiment illustrated in FIGS. 1 and 2 the one or more processors 50 were implemented using a Raspberry Pi A+ microcomputer. A separate LED driver circuit (TLC5941 available from Texas Instruments) was used to drive the LEDs 40. It should be understood, however, that any number of different computing solutions may be employed to control the vacuum pump 14 and illumination sources 40. These include custom-designed application-specific integrated circuits (ASICS) or custom programmable open-architecture processors and/or microcontrollers. In one embodiment, the one or more processors 50 include wired and/or wireless communication link that is used to transmit images obtained from the image sensor 24 to a separate computing device 52 such as that illustrated in FIG. 5. For example, images I obtained with the image sensor 24 may be transferred to a separate computing device 52 through a wired communication like that uses a USB cable or the like. Similarly, the one or more processors 50 may contain a wireless communication link or functionality to that image files may be wireless transmitted to a computing device 52 using a Wi-Fi or Bluetooth® connection.

The one or more processors 50, the one or more illumination sources 40, and the vacuum pump 14 are powered by an on-board battery 54 as seen in FIG. 1 that is contained within the housing 12. The battery 54 may, in one embodiment, be a rechargeable battery. Alternatively, or in conjunction with the battery 54, a corded power source may be used to power the on-board components of the lens-free microscope device 10. With reference to FIG. 2, voltage control circuitry 56 is provided to provide the one or more processors with the required voltage (e.g., 5V DC) as well as the vacuum pump (12V DC).

Figure 5:
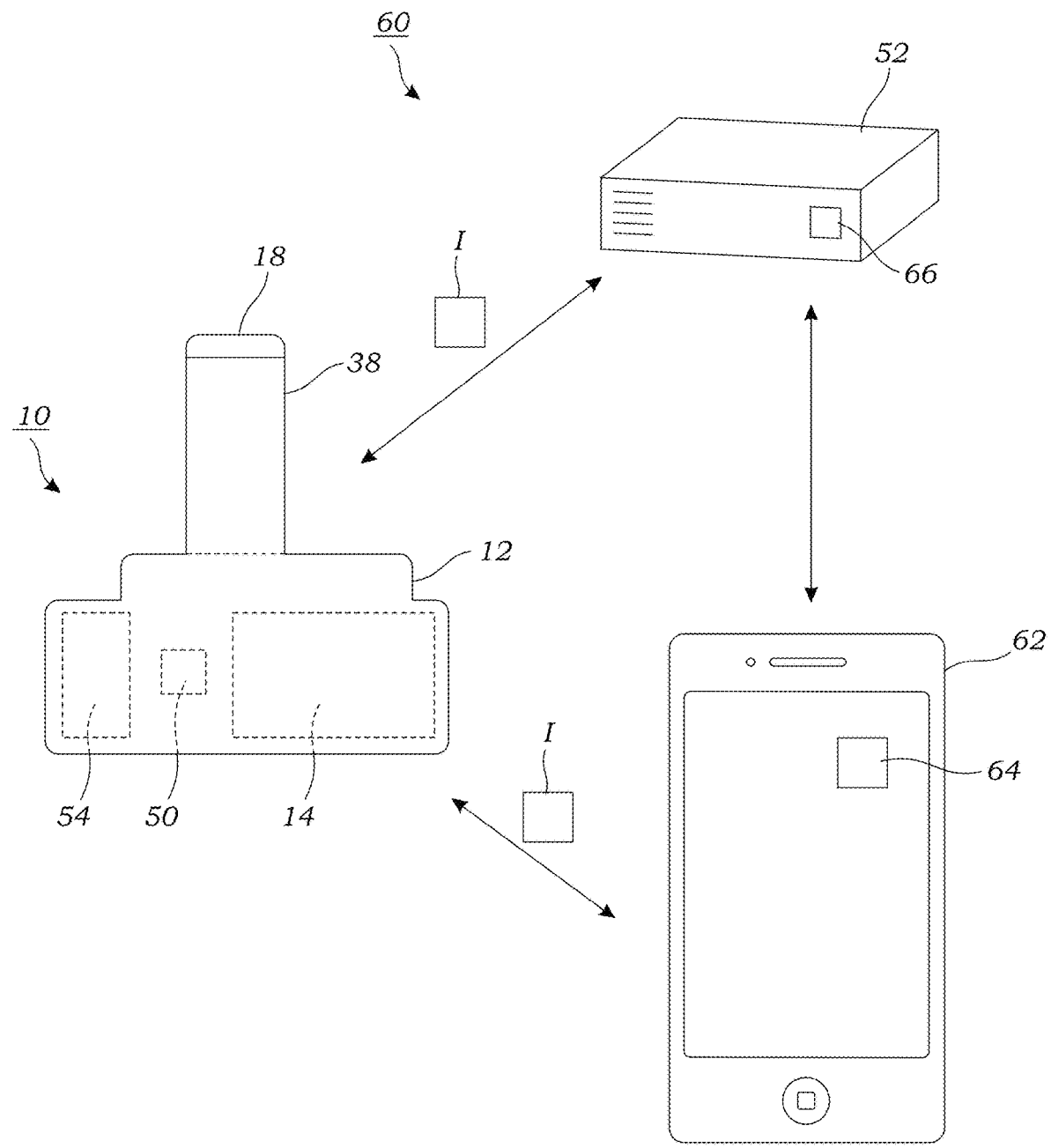
FIG. 5 illustrates a schematic view of a system that uses the lens-free microscope device of FIGS. 1 and 2. The system includes a computing device (e.g., server) and a portable electronic device (e.g., mobile phone).

FIG. 5 illustrates a schematic view of a system 60 that uses the lens-free microscope device 10 described herein. The system 60 includes a computing device 52 that is used to generate and/or output reconstructed particle images (containing phase and/or amplitude information of the particles 100), particle size data, particle density data, and/or particle type data from holographic images or diffraction patterns of particles captured on the optically transparent substrate 34. The computing device 52 contains software 66 thereon that processes the raw image files (I) obtained from the image sensor 24. The computing device 52 may include a local computing device 52 that is co-located with the lens-free microscope device 10. An example of a local computing device 52 may include a personal computer, laptop, or tablet PC or the like. Alternatively, the computing device 52 may include a remote computing device 52 such as a server or the like. In the later instance, image files obtained from the image sensor 24 may be transmitted to the remote computing device 52 using a Wi-Fi or Ethernet connection. Alternatively, image files may be transferred to a portable electronic device first which are then relayed or re-transmitted to the remote computing device 52 using the wireless functionality of the portable electronic device 62 (e.g., Wi-Fi or proprietary mobile phone network). The portable electronic device may include, for example, a mobile phone (e.g., Smartphone) or a tablet PC or iPad®. In one embodiment, the portable electronic device 62 may include an application or "app" 64 thereon that is used to interface with the lens-free microscope device 10 and display and interact with data obtained during testing.

Figure 6:
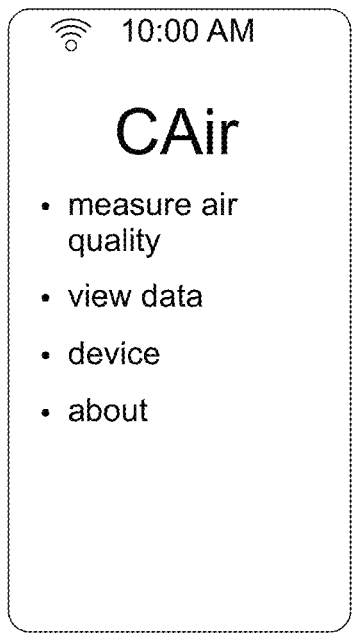
FIG. 6 illustrates a panel of images (i)-(v) showing various screenshots of an application that is used in conjunction with the lens-free microscope to operate the same and display results of air monitoring.
Figure 6:
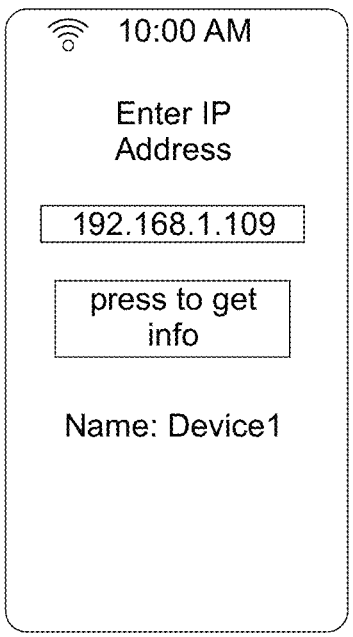
Figure 6:
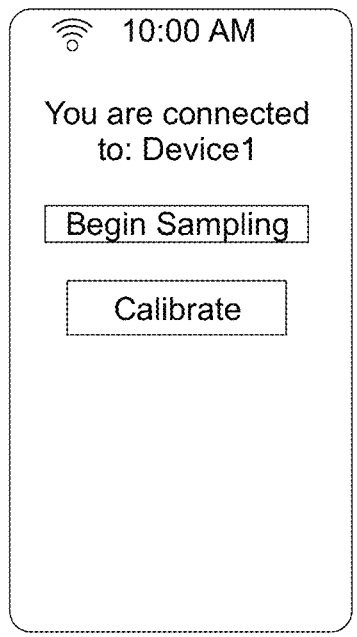
Figure 6:
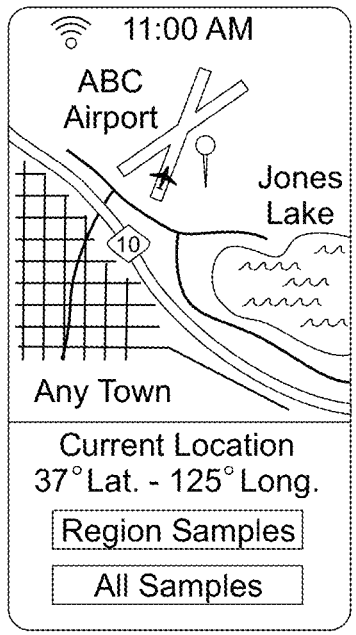
Figure 6:
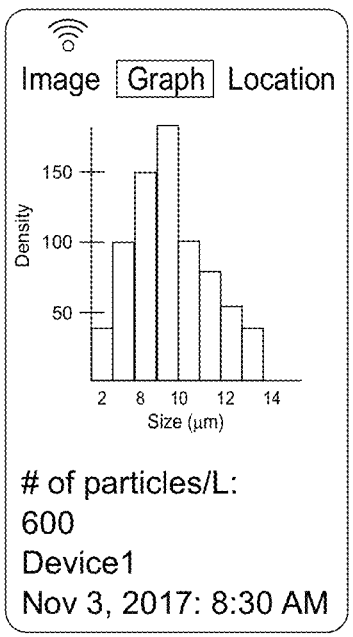

For example, in one embodiment, as seen in panel image (i) of FIG. 6, the application 64 on the portable electronic device 62 includes a user interface that displays a "welcome" screen that presents the user with various options such as: measure air quality (i.e., run a test), view data from a previously run test, information about the lens-free microscope device 10, etc. Panel image (ii) of FIG. 6 illustrates another screen shot that provides the user the ability to manually enter the IP address of the lens-free microscope device 10. Of course, in other embodiments, the IP address of the lens-free microscope device 10 may be automatically recognized. Panel image (iii) of FIG. 6 illustrates a screen shot showing that the application 64 is connected to the lens-free microscope device 10 and is ready for sampling or calibration. Panel image (iv) of FIG. 6 illustrates another screen shot of the application 64 showing a map that illustrates the current location (using GPS coordinates obtained from the portable electronic device 62). The application 64 also provides the user to option of seeing other samples within the same vicinity or region or all samples. Panel image (v) of FIG. 6 illustrates the user interface that is presented to the user to view various PM data regarding a particular test. In this embodiment, the data that is displayed to the user includes a particle density histogram (y axis: particles/L; x axis: particle size (μm)) as well as the number of particles per liter. These may be presented to user numerically or as a graph. Also illustrated are the time and date of the particular test. Reconstructed particle images may also be displayed to the user. Panel image (vi) of FIG. 6 illustrates different tests performed with the lens-free microscope device 10 including the date and time. These may be selected by the user for review of the PM results. The user also has the option using tabs to view the image obtained or details regarding the location of the test (e.g., a map like that illustrated in panel image (iv)). In another embodiment, the user interface allows search functionality. For example, a user may search one or more of particle size, particle density, particle type, sample location, sample date, sample time, or the like.

Figure 7:
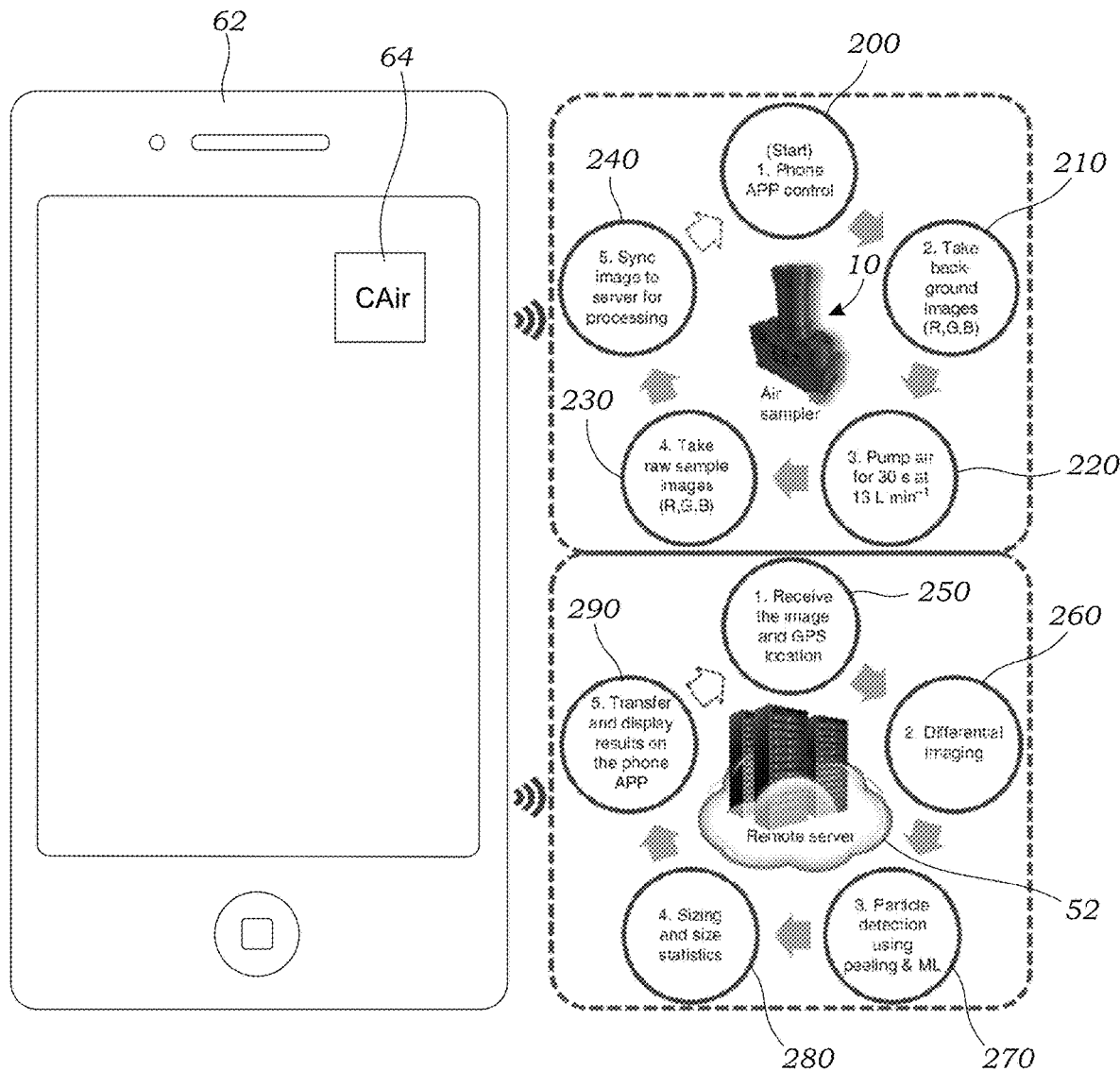
FIG. 7 illustrates the workflow order that takes place in the lens-free microscope device as well as the computing device.

FIG. 7 illustrates the workflow order that takes place in the lens-free microscope device 10 as well as the computing device 52. In the embodiment of FIG. 7, the portable electronic device 62 is illustrated that contains the application or "app" 64 loaded thereon that is used to operation the lens-free microscope 10 to measure air quality. The portable electronic device 62 is also used to transmit and receive data and results from the computing device 52 which in this embodiment is a remote server. With reference to operation 200, the user first starts the application 64 on the portable electronic device 62. Next, as seen in operation 210, background images are taken using the one or more illumination sources 40 (e.g., red, blue, green LEDs). These images are used for background subtraction to remove any particles 100 that may be adhered or located on the optically transparent substrate 34. Next, as seen in operation 220, the vacuum pump 14 is initiated to pump for about thirty (30) seconds. In the illustrated embodiment, the rate is 13 L/min but other flow rates may be used. Next, as seen in operation 230, raw sample images are taken sequentially with illumination from the one or more illumination sources 40. In operation 240, the raw image files are then transferred and synchronized with the computing device 52 for image processing. In this operation, the wireless functionality of the portable electronic device 62 is used to transfer the raw image files.

FIG. 7 also illustrates the workflow order that takes place in the computing device 52 to process the raw image files. As seen in operation 250, the computing device 52 receives the raw image(s). The image(s) are also tagged with information about the date and time in which they were obtained as well as GPS coordinate data. Next, in operation 260, the software 66 located on the computing device 52 performs differential imaging to background-subtract any particles 100 that were on the optically transparent substrate 34. In operation 270, the differential images that are obtained are then subject to particle detection using the peeling and machine learning (ML) algorithms executed by the software 66 described in more detail below. The software 66 outputs particle sizing and/or type data as illustrated in operation 280. These results are then transferred to the portable electronic device 62 for display on the user interface of the application 64 as seen in operation 290.

Figure 8:
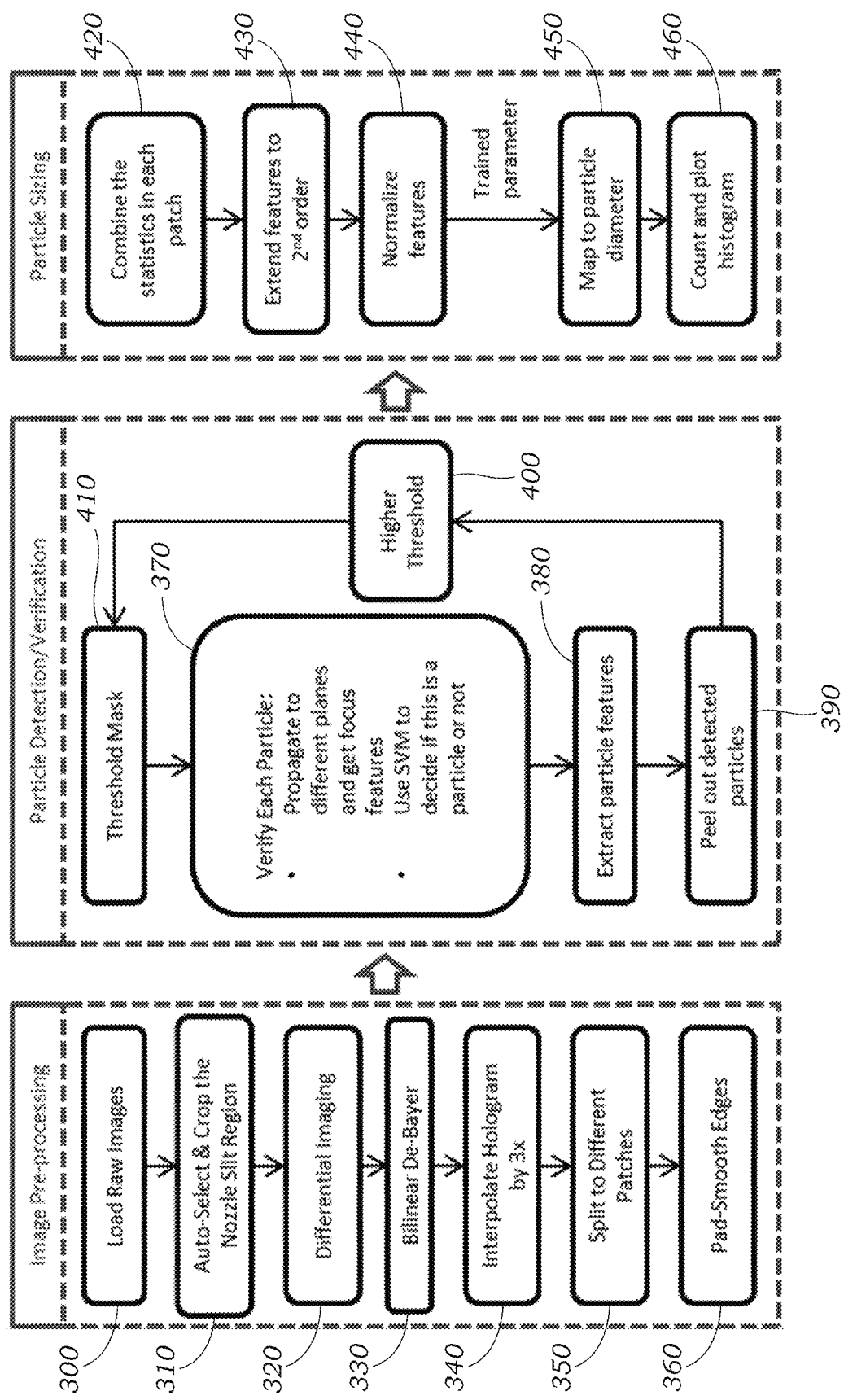
FIG. 8 illustrates the algorithm that is executed by the software for performing particle detection as well as particle analysis (i.e., outputting particle count, particle density, particle statistics, and/or particle type).

FIG. 8 illustrates in detail the algorithm that is executed by the software 66 for performing particle detection as well as particle analysis (i.e., outputting particle count, particle density, particle statistics, and/or particle type). The algorithm is roughly divided into three functions: image pre-processing, particle detection/verification, and particle sizing. In the image pre-processing operation, the raw images are loaded as seen in operation 300. The software then selects and crops the larger field-of-view to match the rectangular slit region on the raw image as seen in operation 310. Differential imaging is then performed in operation 320 to subtract out any particles 100 that may have existed on the optically transparent substrate 34 prior to the current air measurement operation. Next, as seen in operation 330, the differential image is then subject to bilinear de-Bayering to retain information corresponding to the particular color channel. De-Bayering may also take place prior to differential imaging in another embodiment. Next, in operation 340, the holograms are subject to interpolation to get sub-pixel resolution and avoid pixel artifacts. The image is then split into different "patches" in operation 350. This operation is used to speed up the focusing operation as described herein because the starting point or distance used for the focusing aspect can be used for all particles within the same patch. Next, in operation 360, the four edges of each patch are subject to pad-smoothing, which is needed in order to avoid the boundary-discontinuity-generated ringing artifact after Discrete Fourier Transform.

Turning now to the particle detection/verification portion of the algorithm, for each patch, the particles are subject to digital focusing operation is performed using the Tamura coefficient for estimating the z distance from the particle 100 to the sensor plane of the image sensor 24. A "peeling" operation is also employed in the holographic reconstruction process to reject spatial artifacts that are created as part of the image reconstruction operation. Operation 370 shows that digital focusing operation is performed and a morphological reconstruction process is performed and various spectral and spatial features of the particle 100 are extracted. In one embodiment, the extracted features include minimum intensity average intensity $I_a$, area A, and maximum phase $\theta_M$, $R_{Tam}$, which is explained herein is a ratio of the Tamura coefficient of a particular focus plane against the largest Tamura coefficient at different propagated z planes. The extracted spectral and spatial features are fed to a SVM-based machine learning model to digitally separate spatial artifacts from true particles. The extracted spectral and spatial features are also extracted and stored (seen in operation 380) and are then later used for particle sizing and/or type analysis. Additional spatial parameters include maximum intensity, standard deviation of intensity, maximum phase, minimum phase, average phase, standard deviation of phase, eccentricity of intensity, and eccentricity of phase. For example, these spatial parameters may be used to identify particle sizes, particle densities, and particle types.

The peeling operation 390 consists of erasing or removing particles at increasing thresholds relative to background. Thus, the easiest to find (e.g., brightest) are first identified and reconstructed and then digitally erased. A higher threshold is then established as seen in operation 400 and then the image is then subject to the threshold mask (operation 410) whereby the mask is applied and the particles that are not masked out are subject to auto-focusing and rejection of spatial artifacts by the SVM model as described above. In one embodiment, there are a plurality of such peeling cycles performed (e.g., four (4)) with increasing thresholds being applied at each cycle.

For particle sizing, the extracted spectral and spatial features for each patch are combined as seen in operation 420. A model (f) is then used to map these features to the diameter of the particles 100. While the function may have any number of dimensions, a second-order polynomial model of f was used and the extracted spectral and spatial features were extended to the second order (see Equation 2 herein) as seen in operation 430. Normalization of the features is then performed in operation 440 (see Equation 3 herein). Next, a trained machine learning model that was trained with ground truth particles that were manually measured was used to map the trained spectral and spatial features to particle diameter as seen in operation 450. Having all the particle diameters, the particle count and particle statistics can be output as illustrated in operation 460. This may include, for example, a histogram such as that illustrated in panel image (v) of FIG. 6. While FIG. 8 illustrates the algorithm for particle sizing, a similar trained machine learning model (trained with particles of known type) may be used to map normalized features to particle type. Instead of particle diameter the output would be particle type and/or statistical data related to the same. For example, the particle type may describe the source or nature of the particle 100 that was captured and imaged (e.g., bacteria particle, virus particle, pollen partible, mold particle, biological particle, soot, inorganic particle, metal particle, organic particle).

Experimental

Air Platform Spatial Resolution, Detection Limit, and Field of View

FIGS. 1 and 2 illustrates the lens-free microscope device 10 (i.e., the c-Air platform or system) that was used to collect particular matter (PM) and perform particle measurements. The c-Air platform was composed of portable, housing (which may be 3D printed or the like) that includes an impaction-based air-sampler (i.e., an impactor or impaction nozzle) and a lens-free holographic on-chip microscope setup as explained herein. The lens-free microscope used three partially coherent light sources (LEDs) emitting light at 470 nm, 527 nm, and 624 nm that were coupled to separate optical fibers that terminated in a header which are used for illumination. The lens-free microscope further included a complementary metal-oxide semiconductor (CMOS) image sensor chip (OV5647, RGB, 5 MPix, 1.4 μm pixel size), which is placed ~0.4 mm below the transparent surface of the impactor with no image formation unit (e.g., lens) located between them. The housing holds a vacuum pump that drives air through the air-sampler. Aerosols within the airflow are then collected on a sticky or tacky coverslip of the air-sampler located below the impaction nozzle as described herein. The lens-free microscope device 10 was powered by a rechargeable battery and is controlled by a microcontroller that is also located or contained in the housing.

In the experiments described herein, the microcontroller is a Raspberry Pi A+. The microcontroller may include wireless transfer functionality such that images and data may be communicated from the portable microscope device to a server via Wi-Fi, Bluetooth®, or the like. Alternatively, the microcontroller may communicate with a portable electronic device such as a Smartphone or the like that runs a custom-application or "app" that is used to transfer images to the computing device 52 (e.g., it acts as a hotspot) operate the device as well as display results to the user using the display of the portable electronic device. Here, the microcontroller is used to run the vacuum pump, control the light sources, control the image sensor (CMOS sensor), saves the images, transfers the image and coordinates the communication of the device with the computing device 52. Control of the device may be accomplished, in one embodiment, by the portable electronic device (e.g., Smartphone or tablet PC).

The collected aerosol particles 100 are imaged and quantified by the lens-free microscope device 10. In one preferred aspect of the invention, the holographic images obtained with the lens-free microscope device are used in conjunction with a portable electronic device (e.g., Smartphone, tablet PC) that includes a custom software application 64 thereon that is used to control the microscope device as well as transfer images and data to and from a computing device 52 (e.g., server) that is used to process the raw images obtained using the microscope device 10.

Processing of the acquired c-Air images was remotely performed. As shown in FIG. 5, the overall system is composed of three parts: (1) the lens-free microscope device 10 (i.e., c-Air device), which takes the air sample and records its image, (2) a computing device 52 (e.g., remote server), which differentially processes the lens-free images (comparing the images taken before and after the intake of the sample air) to reconstruct phase and/or amplitude images of the newly captured particles and analyze them using machine learning, and (3) an iOS-based app 64, which controls the device, coordinates the air-sampling process, and displays the server-processed air sample images and corresponding PM results.

Figure 9:
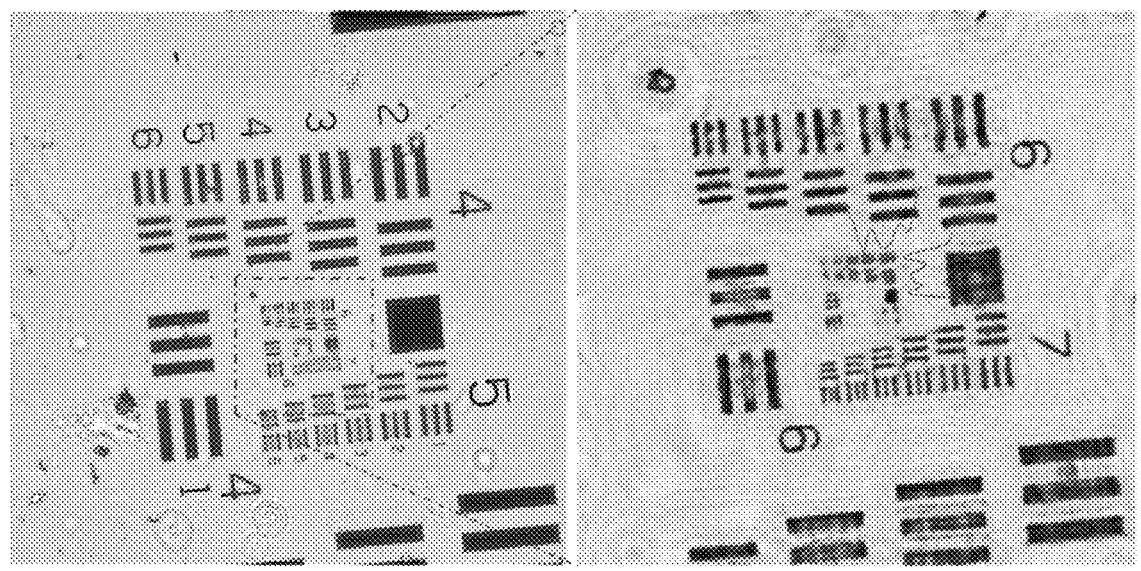
FIG. 9 illustrates the c-Air spatial resolution test. The finest resolved feature is group 8, element 2, which has a line-width of 1.74 µm.

The USAF-1951 resolution test target was used to quantify the spatial resolution of the lens-free microscope device 10. The reconstructed image of this test target is shown in FIG. 9, where the smallest resolvable line is group eight, element two (line width 1.74 μm), which is currently pixel-size limited due to the unit magnification imaging geometry. If required in future applications, a better resolution (e.g., ≤0.5 μm) can be achieved in the c-Air platform using a CMOS sensor with a small pixel size and/or by applying pixel super-resolution techniques to digitally synthesize smaller pixel sizes.

In the reconstructed lens-free differential images, the detection noise floor was defined as 3σ (σ≈0.01 is the standard deviation of the background) from the background mean, which is always 1 in a given normalized differential image. For a particle to be viewed as detected, its lens-free signal should be above this 3σ noise floor. 1 μm particles were clearly detected, which was also cross-validated by a benchtop microscope comparison. It should be noted that, as desired, this detection limit is well below the 50% cut-off sampling diameter of the impactor ($d_{50}$=1.4 μm).

In terms of the imaging field of view, the active area of the CMOS sensor in the c-Air design used for experiments herein was 3.67×2.74=10.06 mm². However, in the impactor air sampler geometry, the particles are deposited immediately below the impaction nozzle. Thus, the active area that will be populated by aerosols and imaged by the lens-free microscope device will be the intersection of the active area of the CMOS sensor and the impaction nozzle opening. Because the slit has a width of only 1.1 mm, the resulting effective imaging field of view of tested c-Air device was 3.67×1.1=4.04 mm². With either the selection of a different CMOS image sensor chip or a custom-developed impaction nozzle, the nozzle slit area and the image sensor area can have larger spatial overlaps to further increase this effective field of view.

Machine Learning Based Particle Detection and Sizing

A custom-designed machine-learning software algorithm was used on the computing device 52 (e.g., server) that was trained on size-calibrated particles to obtain a mapping from the detected spatial characteristics of the particles to their diameter, also helping to avoid false positives, false negatives as well as over-counting of moved particles in the detection process. For this purpose, spectral and spatial features were extracted from the holographic particle images, including e.g., minimum intensity $I_m$, average intensity $I_a$, and area A, and a second-order regression model was developed that maps these features to the sizes of the detected particles in microns. The model is deterministically learned from size-labeled particle images, which are manually sized using a standard benchtop microscope. Specifically, after extraction of the features $I_m$, $I_a$, and A of the masked region in a particle peeling cycle, a model is developed, f, that maps these features to the particle diameter D in microns, i.e., $$D = f(I_m, I_a, \sqrt{A}) \quad (1)$$

where f can potentially have infinite dimensions. However, a simplified second-order polynomial model of f was employed and the features were extended to the second-order by defining:

$$X = [1, I_m, I_a, \sqrt{A}, I_m^2, I_a^2, A, I_m I_a, I_m \sqrt{A}, I_a \sqrt{A}]. \quad (2)$$

A linear mapping was defined, θ, that relates the second-order features to the diameter of the particle:

$$D = f(I_m, I_a, \sqrt{A}) = \theta^T \hat{X} = \theta^T \left(\frac{X - \mu}{\sigma}\right), \quad (3)$$

where T refers to the transpose operation, and μ and σ represent the mean and standard deviation of X, respectively.

Figure 10:
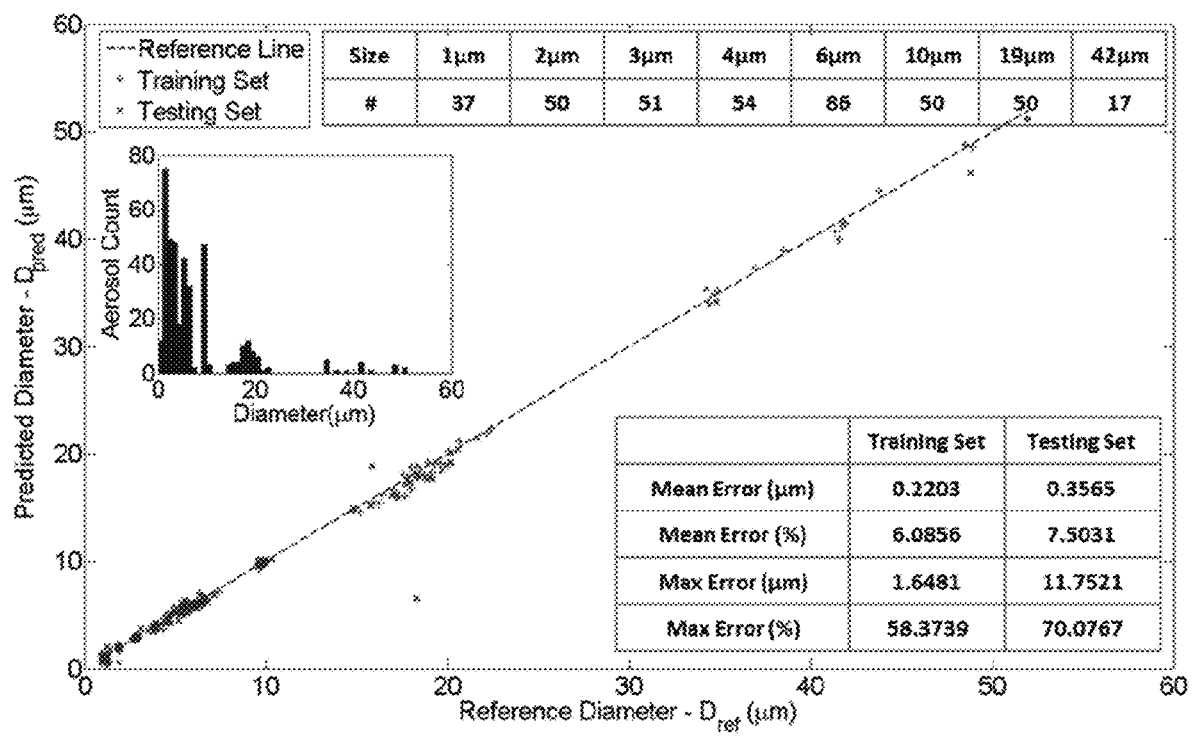
FIG. 10 illustrates a graph of predicted diameter of beads ($D_{pred}$) as a function of reference diameter ($D_{ref}$). The designated bead sizes are shown in the uppermost table. The microscope-calibrated size distribution is plotted as the histogram within the large figure. The large figure in the background shows the machine-learning mapped size ($D_{pred}$) using c-Air. It is compared to the microscope-measured size ($D_{ref}$) for both training and testing sets. The middle dashed line represents $D_{pred}=D_{ref}$. The sizing error, which is defined by equations (5) to (6), is shown in the lower-right table in both µm and the relative percentage. A ~93% accuracy using machine-learning-based sizing is demonstrated.

Based on the above mapping, 395 size-labeled microbeads were used for training and blind testing. These polystyrene microbeads ranged in diameter from ~1 μm to ~40 μm, as shown in FIG. 10. The ground truth sizes of these particles were manually measured under a benchtop microscope with a 100×0.95 numerical aperture (NA) objective lens. The same samples were additionally imaged using the c-Air platform to obtain the corresponding lens-free images and extract spectral and spatial features, $I_m$, $\theta_M$, and A. For training the machine learning model, the microbead samples were randomly and evenly separated into respective training and testing sets. After extending the features to the second-order (equation (2)) and performing normalization (equation (3)), the parameter vector θ was fitted by minimizing the difference between the training feature mapping ($\theta^T \hat{X}_{tr}$) and the calibrated diameter ($D_{tr}^{mic}$) i.e., $$\min_\theta \|\theta^T \hat{X}_{tr} - D_{tr}^{mic}\|_1 \quad (4)$$

This minimization was performed by CVX (Available at: http://cvxr.com/cvx/), a software package designed for solving convex optimization problems. The same trained parameter was then applied for the cross-validation set, which was comprised of another 197 microbeads. Particle sizing training errors ($E_{tr}$) and testing errors ($E_{cv}$) were validated by evaluating the norm of difference:

$$E_{tr}=\|\theta^T \hat{X}_{tr}-D_{tr}^{mic}\|_p \quad (5)$$

$$E_{cv}=\|\theta^T \hat{X}_{cv}-D_{cv}^{mic}\|_p \quad (6)$$

where $\theta^T \hat{X}_{cv}$ is the testing feature mapping, and $D_{cv}^{mic}$ is the calibrated diameter for the testing set. In addition, p=1 is used for calculating the "mean error," and p=∞ is used for calculating the "maximum error." Note that this training process only needs to be done once, and the trained parameter vector, θ, and the normalization parameters, μ and σ, are then saved and subsequently used for blind particle sizing of all the captured aerosol samples using c-Air devices.

FIG. 10 depicts how well the predicted particle diameter, $D_{pred}$, based on the above described machine learning algorithm agrees with the ground-truth measured diameter, $D_{ref}$. The dotted black line in FIG. 10 represents the reference for $D_{ref}=D_{pred}$. As shown in FIG. 10, using machine learning, the tested c-Air device achieved an average sizing error of approximately 7% for both the training and blind testing sets.

Particle Size Distribution Measurements and Repeatability of the c-Air Platform

Two c-Air devices, which were designed to be identical, were used to conduct repeated measurements at four locations: (1) the class-100 clean room of California NanoSystems Institute (CNSI); (2) the class-1000 clean room at CNSI; (3) the indoor environment in the Engineering IV building at the University of California, Los Angeles (UCLA) campus; and (4) the outdoor environment at the second floor patio of the Engineering IV building. At each location, seven samples for each c-Air device were obtained with a sampling period of 30 s between the two successive measurements. These sample c-Air images were processed as described herein, and the particle size distributions for each location were analyzed and compared.

The mean and standard deviation of the seven measurements in each of the four locations are summarized in Table 1 below. It is interesting to note that c-Air measured the TSP density at ~7 counts/L for the class-100 clean room and 25 counts/L for the class-1000 clean room at CNSI, which are both comparable to the ISO 14644-1 clean room standards, i.e., 3.5 counts/L for the class-100 clean room and 36 counts/L for the class-1000 clean room for particles ≥0.5 μm.

The measurements of TSP, PM10, and PM2.5 densities from the same data set were additionally used to elucidate two aspects of the repeatability of the c-Air platform, i.e., the intra-device and inter-device repeatability. The intra-device repeatability is defined as the extent to which the measurement result varies from sample to sample using the same c-Air device to measure the air quality in the same location (assuming that the air quality does not change from measurement to measurement with a small time lag in between). The strong intra-device repeatability of c-Air is evident in the standard deviation (std, σ) in Table 1 below.

TABLE 1

|  |  | Class-100 Clean Room | Class-1000 Clean Room | Indoor | Outdoor |
|---|---|---|---|---|---|
| Device A |  |  |  |  |  |
| Total (count/L) | mean μ | 10.76 | 27.32 | 114.14 | 196.52 |
|  | std σ | 3.34 | 27.94 | 17.09 | 55.25 |

TABLE 1-continued

|  |  | Class-100 Clean Room | Class-1000 Clean Room | Indoor | Outdoor |
|---|---|---|---|---|---|
| PM10 (count/L) | mean μ | 10.76 | 26.92 | 111.59 | 195.84 |
|  | std σ | 3.34 | 27.41 | 17.22 | 55.43 |
| PM2.5 (count/L) | mean μ | 7.95 | 14.88 | 67.99 | 113.36 |
|  | std σ | 2.87 | 14.33 | 12.03 | 43.45 |
| Device B |  |  |  |  |  |
| Total (count/L) | mean μ | 6.14 | 23.57 | 151.63 | 190.89 |
|  | std σ | 6.17 | 22.02 | 67.8 | 18 |
| PM10 (count/L) | mean μ | 6.14 | 23.57 | 147.76 | 190.79 |
|  | std σ | 6.17 | 22.02 | 67.01 | 18.06 |
| PM2.5 (count/L) | mean μ | 4.4 | 16.19 | 89.93 | 116.59 |
|  | std σ | 3.24 | 14.67 | 39.31 | 13.53 |

The inter-device repeatability is defined as the extent to which the results vary from each other using two c-Air devices that are designed as identical to measure the air quality in the same location. To further quantify the inter-device repeatability, a μ-test was performed (i.e., Mann-Whitney μ-test or Wilcoxon rank sum test) on the 2×4 sets of measurement data from devices A and B at four different locations. In the μ-test, the goal was directed to verify the null hypothesis (H=0) for two sets of samples, X and Y:

$$H = 0 : P(X > Y) = P(Y > X) = \frac{1}{2} \quad (7)$$

That is, the experiments strived to test if the medians of the two samples are statistically the same. Compared to other tests for repeatability, e.g., the student t-test, the μ-test requires fewer assumptions and is more robust. A Matlab built-in function, ranksum, was used to perform the μ-test, and the hypothesis results and prominent p-values are summarized in Table 2 below. As shown in this table, the null hypothesis H=0 is valid for all the 2×4 sets of measurement data (from devices A and B at four different locations), showing the strong inter-device repeatability of the c-Air platform.

TABLE 2

|  |  | Class-100 Clean Room | Class-1000 Clean Room | Indoor | Outdoor |
|---|---|---|---|---|---|
| Total (count/L) | H | 0 | 0 | 0 | 0 |
|  | P-value | 0.07 | 0.46 | 0.13 | 0.53 |
| PM10 (count/L) | H | 0 | 0 | 0 | 0 |
|  | P-value | 0.07 | 0.46 | 0.21 | 0.53 |
| PM2.5 (count/L) | H | 0 | 0 | 0 | 0 |
|  | P-value | 0.09 | 0.43 | 0.16 | 0.25 |

2016 Sand Fire Incident Influence at >40-Km Distance Using c-Air Device

Figure 11:
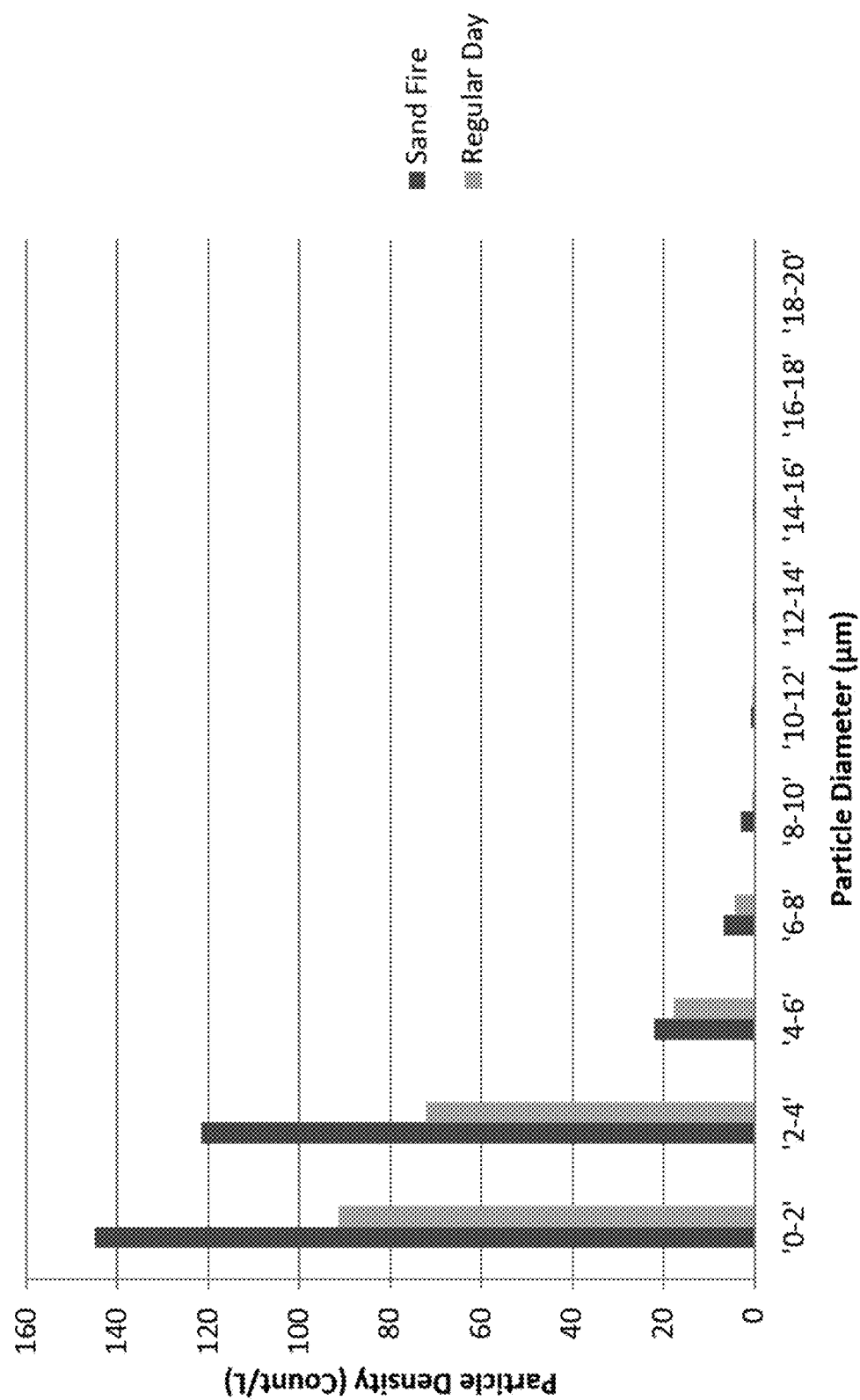
FIG. 11 is a histogram comparison of the sample measured on a regular day, Jul. 7, 2016 at ~4:00 p.m., and the day of the Sand Fire, Jul. 22, 2016 at ~5:00 p.m., at the same location using c-Air.

On Jul. 22, 2016, the Sand Fire incident struck near the Santa Clarita region in California and remained uncontained for several days. Although the UCLA campus is more than 40 km from the location of the fire, on July 23 around noon, smoke and ashes filled the sky near UCLA. Six air samples were obtained using the c-Air device at an outdoor environment at UCLA, as described in the above section. The results were compared with a previous sample obtained on a typical day, Jul. 7, 2016, using the same device and at the same location. The data of both days contained six 30-s air samples measured with c-Air, with a ~2-min interval between the successive samples. For each day, the particle size distributions of the six samples were averaged and the standard deviations were plotted as the histogram in FIG. 11. The results showed that the outdoor PM density significantly increased on the day of the wild fire, especially for particles smaller than 4 µm, which showed an approximately 80% increase. This increase in the density of smaller particles is natural because comparatively smaller particles can travel this long distance (>40 km) and still have significant concentrations in air.

Comparison of c-Air Device with a Standard BAM PM2.5 Instrument

On Aug. 16, 2016, a c-Air device was tested at the Reseda Air Quality Monitoring Station (18330 Gault St., Reseda, Calif., USA) and a series of measurements were made during a 15-h period starting from 6:00 a.m. The performance of the c-Air device was compared with that of the conventional EPA-approved BAM PM2.5 measurement instrument (BAM-1020, Met One Instruments, Inc.).

The EPA-approved BAM-1020 pumps air at ~16.7 L/min and has a rotating filter amid airflow that accumulates PM2.5 to be measured each hour. A beta-particle source and detector pair inside measures the attenuation induced by the accumulated PM2.5 on the filter and converts it to total mass using the Beer-Lambert law. The quantity reported from BAM-1020 is hourly averaged PM2.5 mass density in $\mu g/m^3$. In comparison, the c-Air device is programmed to obtain a 30-s average particle count per 6.5 L of air volume. It performs sizing and concentration measurements using optical microscopic imaging.

To enable a fair comparison, four 30-s measurements were made each hour, with 10- to 15-min intervals between consecutive c-Air measurements. PM2.5 densities were made corresponding to these samples and obtained their average as the final measured PM2.5 density for a given hour. This c-Air average was compared to the hourly average PM2.5 mass density measured by BAM-1020. The measurements of the c-Air device were obtained on the roof of the Reseda Air Sampling Station close to the inlet nozzle of BAM-1020; however, it was situated ~2 m from it to avoid interference between the two systems.

Figure 12A:
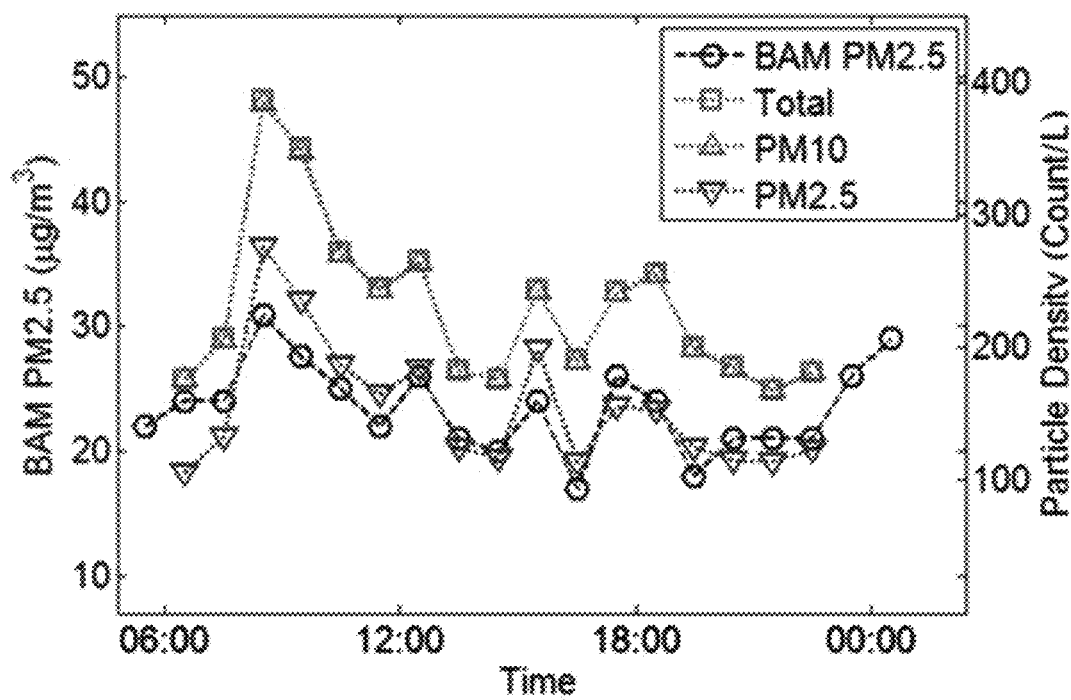
FIG. 12A illustrates a superimposed hourly plot of (right axis) particle density counted by a c-Air device, and (left axis) hourly accumulated PM2.5 total mass density measured by the standard BAM PM2.5 instrument at the Reseda Air Sampling Station.
Figure 12B:
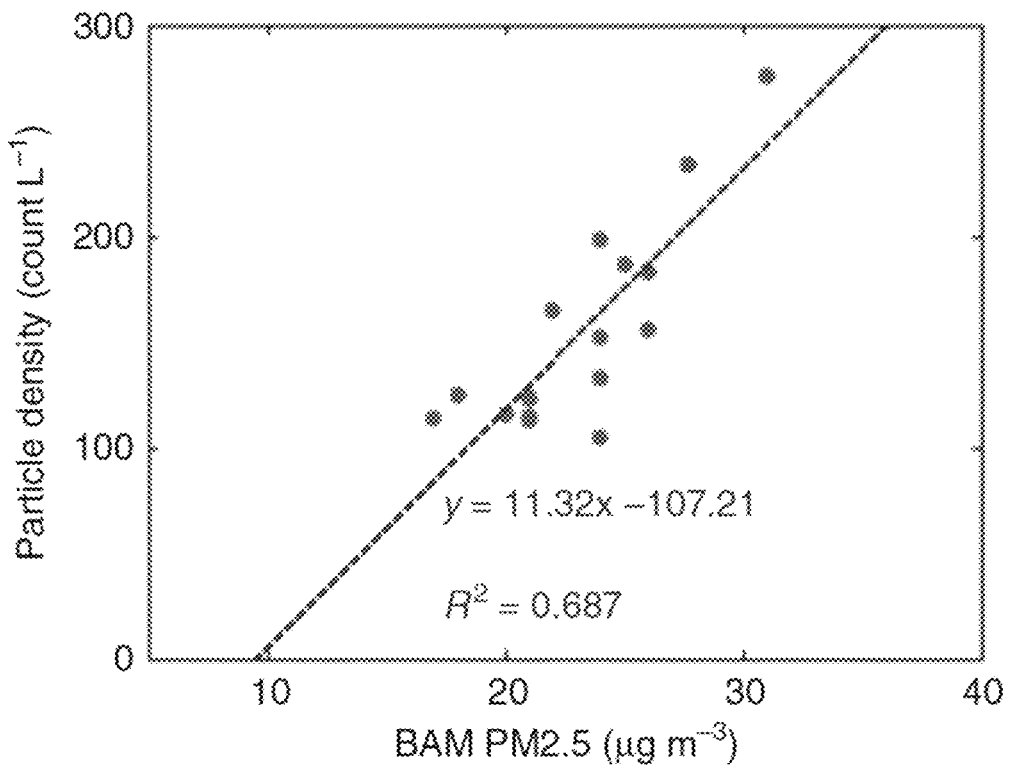
FIG. 12B illustrates linear correlation plot of PM2.5 hourly average count density measured by c-Air (y-axis) with a PM2.5 hourly average mass density measured by BAM-1020 PM2.5 measurement device (x-axis).

FIG. 12A plots the comparison of the measurement results from this c-Air device and BAM-1020. As shown in FIG. 12A, the c-Air device's hourly average PM2.5 count density result closely follows the same trend as the EPA-approved BAM PM2.5 mass density result. Also seem plotted in FIG. 12A is hourly averaged TSP and PM10, which follows a similar trend as PM2.5. Lastly, a linear correlation was found between the BAM PM2.5 measurements and c-Air PM2.5 count density measurements, as shown in FIG. 12B, where the x-axis is the PM2.5 mass density in $\mu g/m^3$ measured by the BAM-1020, and the y-axis is the PM2.5 count density in counts/L measured by the c-Air device. Some of the variations between the two techniques may be due to several reasons: (1) Each PM2.5 particle may have a different weight; therefore, the PM2.5 count density may not directly convert to mass density of the particles; (2) There may be some air-quality variations within each hour; thus, the four 30-s measurements may not accurately represent the whole hourly average reported by BAM-1020; (3) The cut-off size of the impactor is ~1.4 µm, which means particles smaller than this size may not be efficiently counted by the device, whereas they are counted by BAM-1020. Note also that, in FIG. 12A at 7:00 to 9:00 a.m., the original measurements by BAM-1020 are missing on account of the replacement of the rotating filter, which is required for the instrument's maintenance. Instead, these data points are replaced by the average of the 7:00 to 9:00 a.m. time windows on Fridays, which were measured within the same month.

Spatial-Temporal Mapping of Air-Quality Near LAX

On Sep. 6, 2016, two c-Air devices were used, device A and device B, to measure the spatio-temporal air quality changes around Los Angeles International Airport (LAX). Two 24-h measurements were made spanning two different routes that represent the longitudinal and latitudinal directions, which were centered at LAX. Six locations were in each route and measurements were made with a period of 2 h in each route over 24 h. These raw c-Air measurements were sent to the remote server for automatic processing to generate the particle image and particle size statistics at each time and location.

Figure 13A:
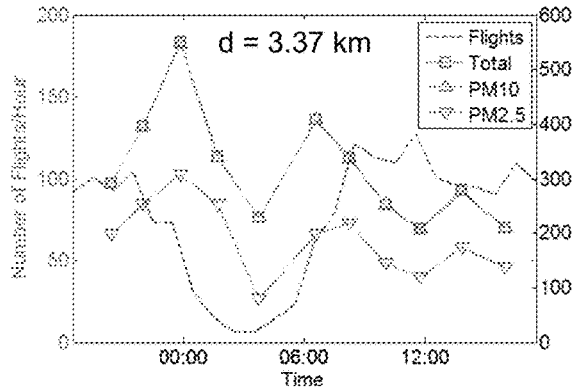
FIG. 13A illustrates a graph showing measured particle density (total, PM10, PM2.5) using the c-Air device (right axis) and number of lights/hour (left axis) as a function of time of day. This testing location (Route 1) was located 3.37 km east of Los Angeles International Airport (LAX).
Figure 13B:
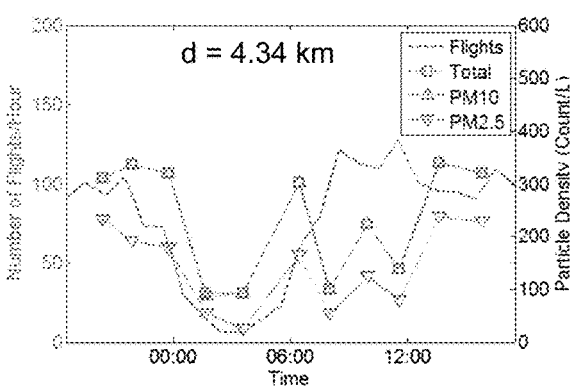
FIG. 13B illustrates a graph showing measured particle density (total, PM10, PM2.5) using the c-Air device (right axis) and number of lights/hour (left axis) as a function of time of day. This testing location (Route 1) was located 4.34 km east of Los Angeles International Airport (LAX).
Figure 13C:
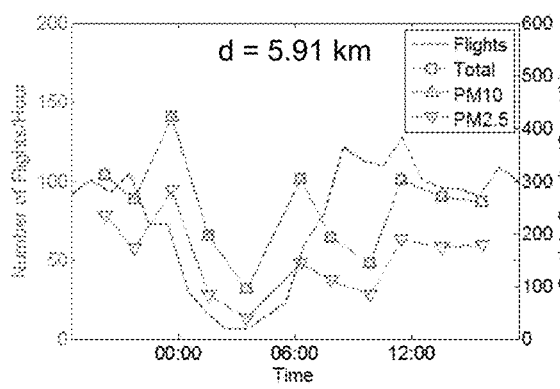
FIG. 13C illustrates a graph showing measured particle density (total, PM10, PM2.5) using the c-Air device (right axis) and number of lights/hour (left axis) as a function of time of day. This testing location (Route 1) was located 5.91 km east of Los Angeles International Airport (LAX).
Figure 13D:
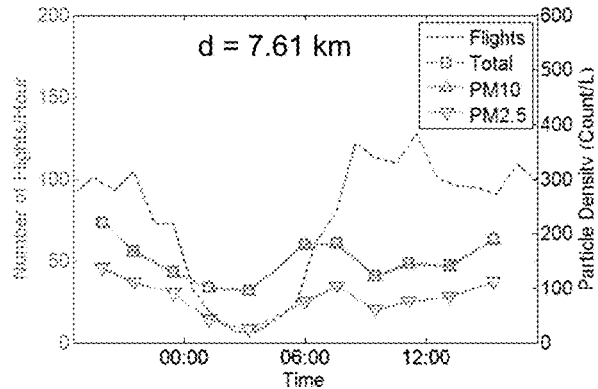
FIG. 13D illustrates a graph showing measured particle density (total, PM10, PM2.5) using the c-Air device (right axis) and number of lights/hour (left axis) as a function of time of day. This testing location (Route 1) was located 7.61 km east of Los Angeles International Airport (LAX).
Figure 13E:
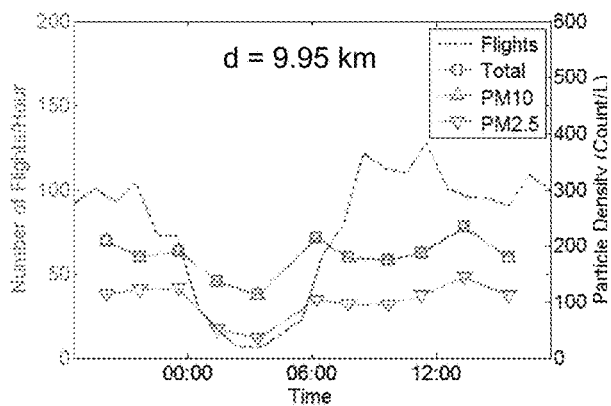
FIG. 13E illustrates a graph showing measured particle density (total, PM10, PM2.5) using the c-Air device (right axis) and number of lights/hour (left axis) as a function of time of day. This testing location (Route 1) was located 9.95 km east of Los Angeles International Airport (LAX).
Figure 13F:
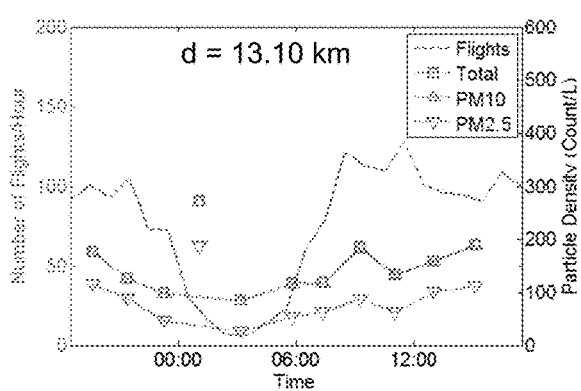
FIG. 13F illustrates a graph showing measured particle density (total, PM10, PM2.5) using the c-Air device (right axis) and number of lights/hour (left axis) as a function of time of day. This testing location (Route 1) was located 13.10 km east of Los Angeles International Airport (LAX).
Figure 13G:
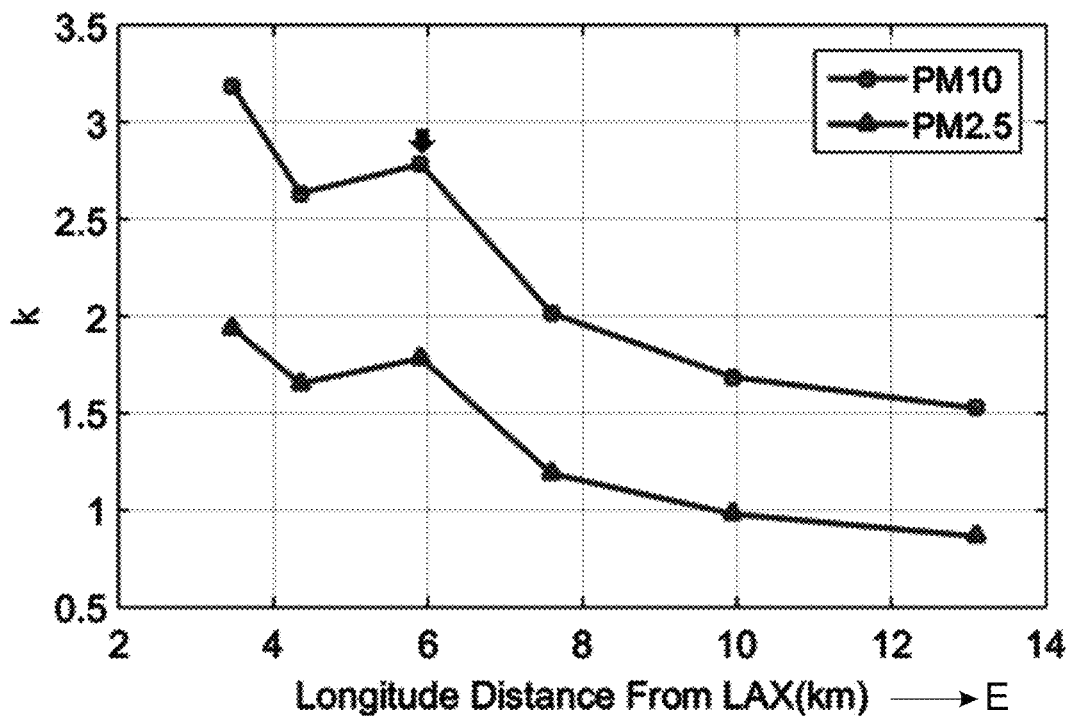
FIG. 13G illustrates a graph of the correlation slope (the slope of the linear mapping from the total number of flights to the PM10 or PM2.5 count density) plotted as a function of longitudinal distance from LAX (Route 1).
Figure 13H:
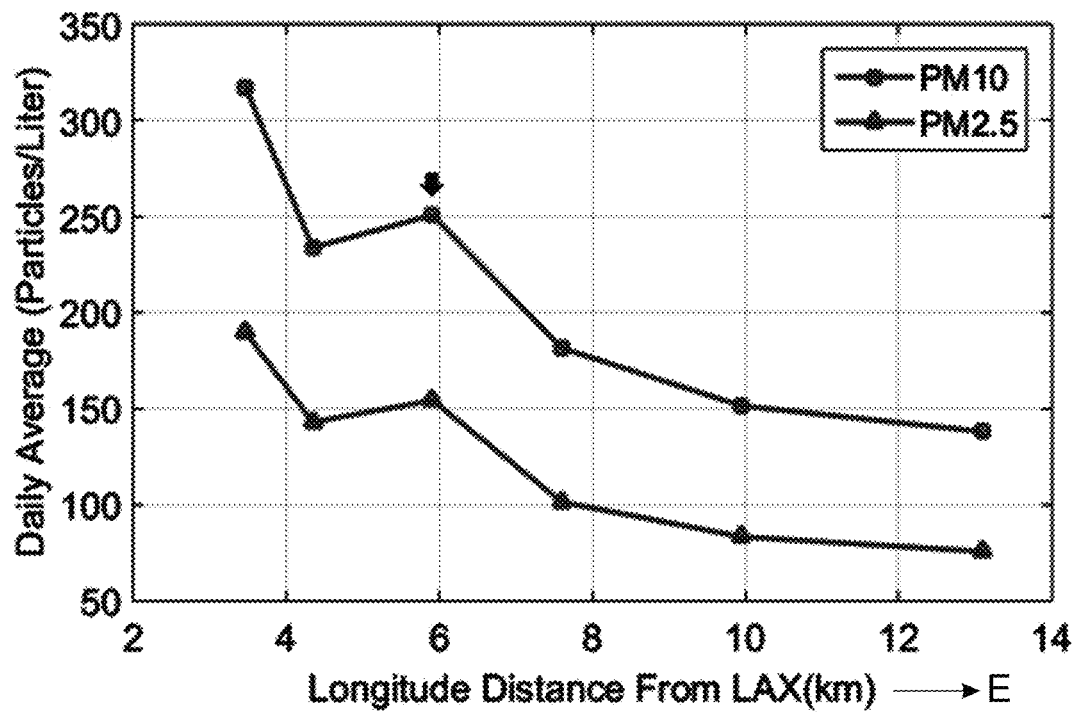
FIG. 13H illustrates a graph of daily average of PM10 and PM2.5 plotted as a function of the longitudinal distance from LAX (Route 1).

Route 1 extended from LAX to the east in a longitudinal direction. Along this route, six sites were located that were located at 3.37 km, 4.34 km, 5.91 km, 7.61 km, 9.95 km, and 13.1 km east of LAX, respectively. LAX shows a pattern of a large number of flights throughout the day (7 a.m. to 11 p.m.); however, it shows a prominent valley at late night (~2 a.m.), where the number of flights is minimal, as shown by the flights curves in FIGS. 13A-13F. As seen in FIGS. 13A-13F, the c-Air measurement results of both PM2.5 and PM10 also show such a valley during late night, which illustrates the relationship between the total number of flights at LAX and the nearby PM pollutants. As the distance increases from LAX, this modulation weakens. To quantify this correlation, two measures were defined: (1) the correlation slope, which is the slope of the linear mapping from the total number of flights to the PM10 or PM2.5 count density (plotted as a function of the longitudinal distance from LAX in FIG. 13G, and (2) the daily average PM measured by c-Air, which is the 24-h average PM10 or PM2.5 count density for each location (also plotted as a function of the longitudinal distance from LAX in FIG. 13H. These figures show an exponential trend for both the correlation slope and the daily average PM as a function of the distance from LAX. Moreover, they indicate that the impact of the airport in increasing air pollution is significant, even >7 km from its location. This has also been independently confirmed in earlier studies, using a commercially available optical scattering based PM detection technology that has a limited dynamic range of particle size and density, and more than an order of magnitude lower throughput compared to the c-Air platform due to its serial read-out scheme. Note also that there is an unexpected point at the third location (5.91 km from LAX), which seems to have a higher pollution level above the exponential trend that is observed. It is believed this is due to the fact that there is a parking lot of approximately 3,400 car spaces in less than 65 m to this measurement location.

Figure 14A:
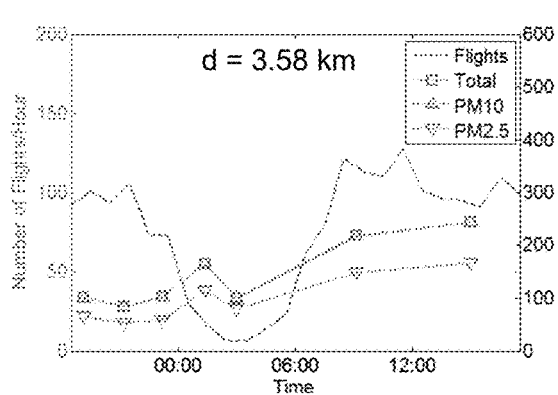
FIG. 14A illustrates a graph showing measured particle density (total, PM10, PM2.5) using the c-Air device (right axis) and number of lights/hour (left axis) as a function of time of day. This testing location (Route 2) was located 3.58 km north of Los Angeles International Airport (LAX).
Figure 14B:
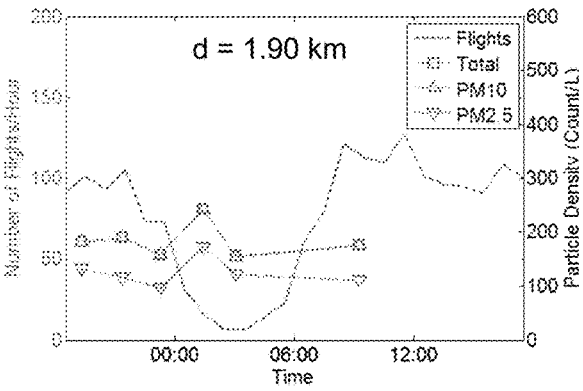
FIG. 14B illustrates a graph showing measured particle density (total, PM10, PM2.5) using the c-Air device (right axis) and number of lights/hour (left axis) as a function of time of day. This testing location (Route 2) was located 1.90 km north of Los Angeles International Airport (LAX).
Figure 14C:
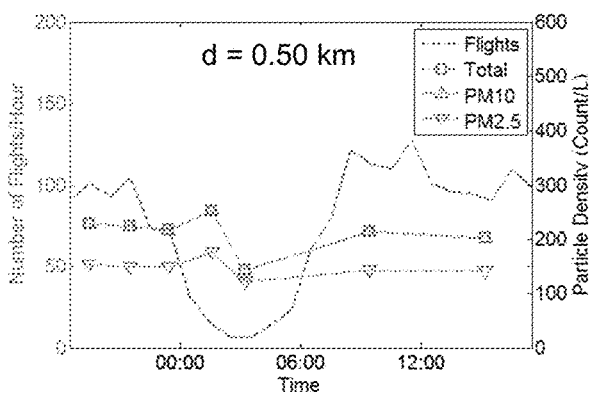
FIG. 14C illustrates a graph showing measured particle density (total, PM10, PM2.5) using the c-Air device (right axis) and number of lights/hour (left axis) as a function of time of day. This testing location (Route 2) was located 0.50 km north of Los Angeles International Airport (LAX).
Figure 14D:
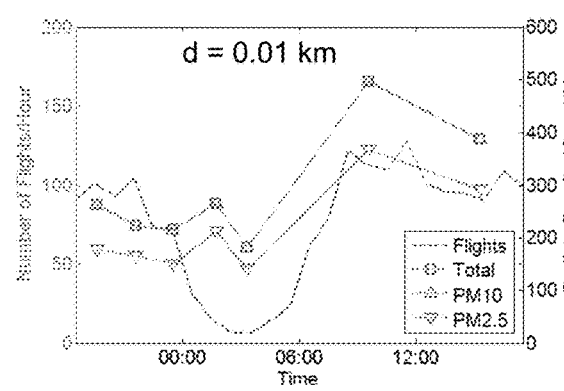
FIG. 14D illustrates a graph showing measured particle density (total, PM10, PM2.5) using the c-Air device (right axis) and number of lights/hour (left axis) as a function of time of day. This testing location (Route 2) was located 0.01 km north of Los Angeles International Airport (LAX).
Figure 14E:
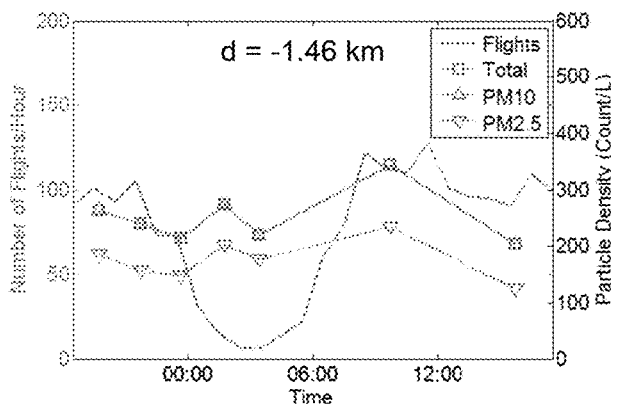
FIG. 14E illustrates a graph showing measured particle density (total, PM10, PM2.5) using the c-Air device (right axis) and number of lights/hour (left axis) as a function of time of day. This testing location (Route 2) was located −1.46 km south of Los Angeles International Airport (LAX).
Figure 14F:
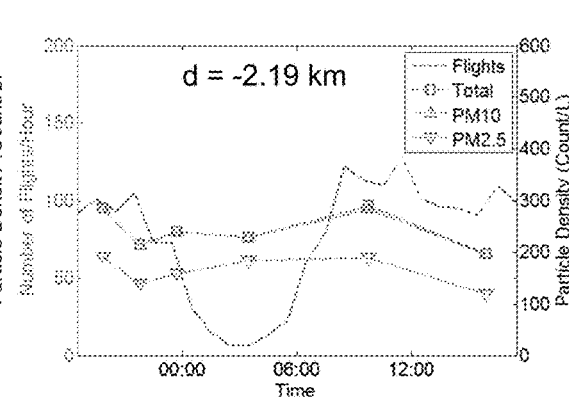
FIG. 14F illustrates a graph showing measured particle density (total, PM10, PM2.5) using the c-Air device (right axis) and number of lights/hour (left axis) as a function of time of day. This testing location (Route 2) was located −2.19 km south of Los Angeles International Airport (LAX).
Figure 14G:
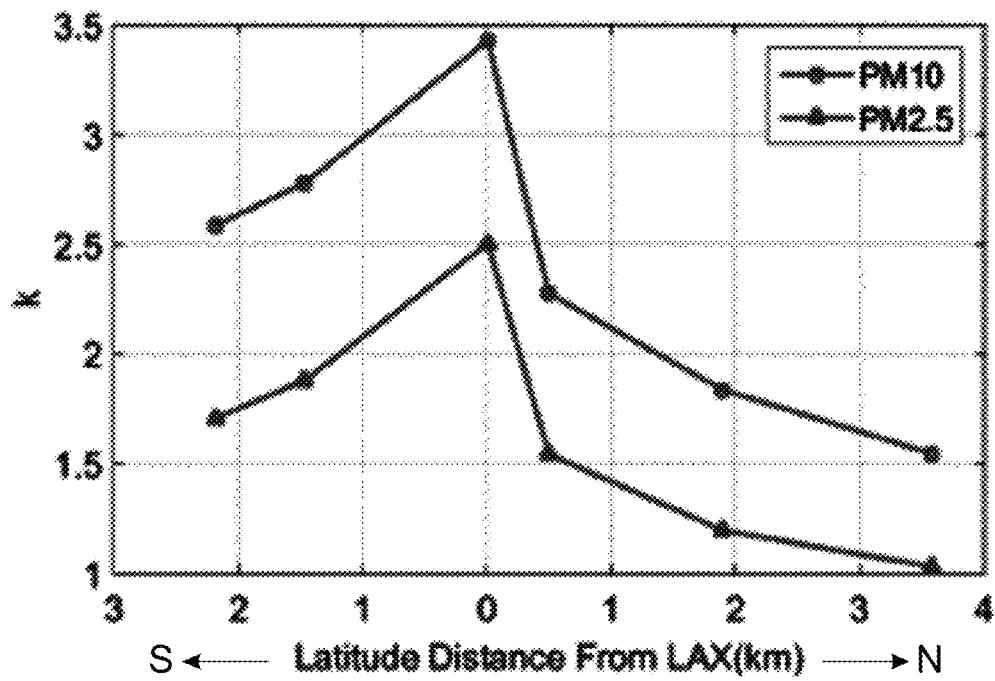
FIG. 14G illustrates a graph of the correlation slope (the slope of the linear mapping from the total number of flights to the PM10 or PM2.5 count density) plotted as a function of longitudinal distance from LAX (Route 2).
Figure 14H:
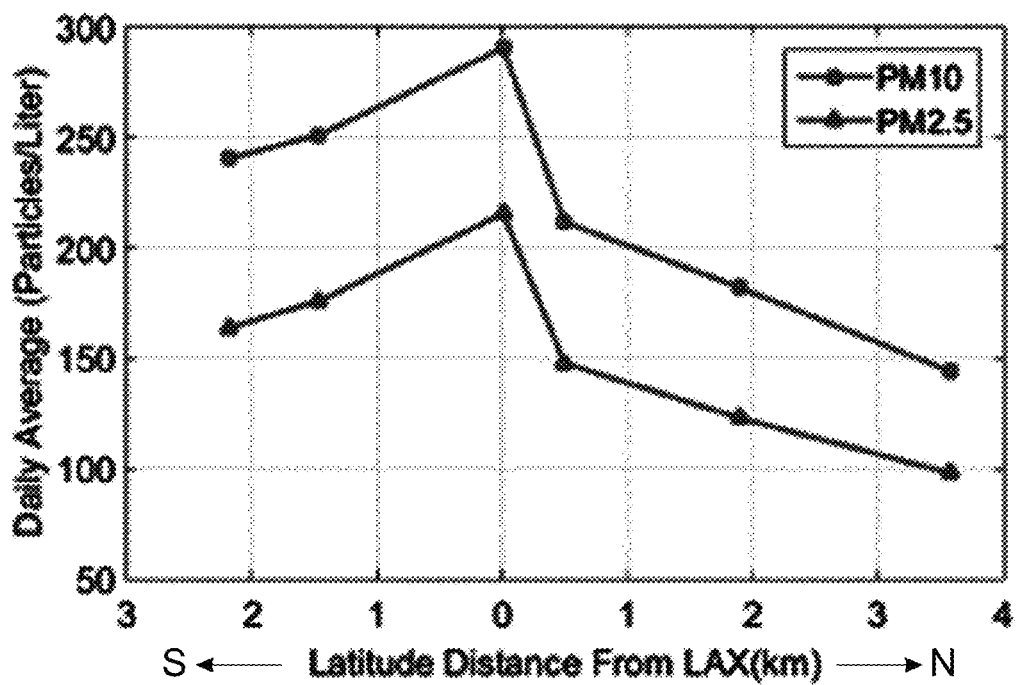
FIG. 14H illustrates a graph of daily average of PM10 and PM2.5 plotted as a function of the longitudinal distance from LAX (Route 2).

Unlike Route 1, Route 2 extended from the south to the north of LAX, spanning a latitudinal direction. The six locations chosen in this route were located 3.58 km, 1.90 km, 0.50 km, 0.01 km, −1.46 km, and −2.19 km north of LAX, respectively. Similar to Route 1, FIGS. 14A-14F plot the time variations of the PM concentration during the sampling points corresponding to Route 2. These results once again show a similar trend of PM variation in accordance with the total number of flights at LAX. Similar to Route 1, as the measurement location distance from LAX increases, the modulation strength diminishes. The above finding is supported by the correlation slope shown in FIG. 14G and the daily average PM shown in FIG. 14H, both of which are a function of the latitudinal distance north of LAX. It was observed that the decrease is more rapid in this latitudinal direction (south-to-north, Route 2) than the longitudinal direction (west-to-east, Route 1), which may be on account of the typical west winds near LAX during the summer, which cause the particles to travel longer distances in air.

Methods

Impaction-Based Air-Sampler

To capture aerosols, an impaction-based air sampler was used on account of its high-throughput, simple hardware, and compatibility with microscopic inspection. As described herein, the impactor that was used in the lens-free microscope device includes an impaction nozzle and a sticky or tacky sampling coverslip (Air-O-Cell Sampling Cassette, Zefon International, Inc.). The off-the-shelf Air-O-Cell sampling cassette was taken apart and the upper portion was used that contained the impaction nozzle and sticky coverslip. The sticky coverslip was then rested directly on the imaging sensor. A vacuum pump (Micro 13 vacuum pump (Part No. M00198) available from Gtek Automation, Lake Forrest, Calif.) drives the laminar airstream through the nozzle at high speed. The sticky or tacky coverslip is placed to directly face the airstream. The airstream can be easily redirected while the aerosol inside the stream impacts with and is collected by the sticky coverslip. This collection is subsequently used for computational imaging.

The aerosol captured by the impactor is actually a random process. The probability that an individual aerosol particle passing through the impactor will be captured depends on the particle size, laminar airflow rate, and nozzle width. This probability is related to the Stokes number (Stk):

$$Stk = \frac{\rho_P d_P^2 U C_c}{9\eta D_j} \quad (8)$$

where $\rho_p$ is the particle mass density, $d_P$ denotes the particle diameter, U represents the flow velocity, $\eta$ is the air viscosity, and $D_j$ denotes the nozzle diameter. The impaction efficiency increases as Stk increases. Based on the same terminology, the cut-off size, $d_{50}$, is defined as the diameter of the particle at which the impaction efficiency decreases to 50%. In the experimental design, the air sampler (with a nozzle of 1.1 mm by 14.5 mm) was connected to and driven by a miniaturized pump with a throughput of 13 L/min. Based on the above relationship, the 50% cut-off sampling diameter can be estimated as $d_{50}$=1.4 μm.

c-Air Lens-Free On-Chip Microscope and Air Sampling Design

For rapid imaging and inspection of the collected aerosols, the impactor was combined with a lens-free microscope in a single mobile device as shown FIGS. 1-4. The sticky coverslip, which was used to capture the sample to be imaged, together with the impactor nozzle cartridge were directly placed on a color CMOS image sensor at a distance of approximately 400 μm from the image sensor to the sticky coverslip. Of course, other distances could be used provided that holographic images of the particles can still be obtained. Three fiber-coupled LEDs (red: 624 nm; green: 527 nm; blue: 470 nm) were fixed on top of the device sampler tube at approximately 8 cm from the image sensor chip. Using LED illumination, the aerosol samples, which were captured by the sticky coverslip, cast in-line holograms. These holograms were recorded by the CMOS image sensor for holographic reconstruction and further processing to determine the PM statistics. Due to the close proximity of the particles to the sensor surface, both the spatial and temporal coherence of the source could be partial, thereby eliminating the need for laser-based illumination.

The image capturing and air sampling processes are illustrated in FIG. 7. When the user makes the request to "capture a sample" from the app user interface, the three LEDs are sequentially turned on/off, and three background images are thereby obtained. These background images depict the state of the air-sampler surface prior to the intake of the air to be sampled. Based on the coverage of the particles in a given background image, the device alerts the user for replacement of the air sampler surface. Depending on the level of air contamination, the same air sampler can be used several times before requiring replacement based on the contamination of its surface area.

Next, the pump was powered on to push the air through the sampler for 30 seconds, thereby screening 6.5 L of air. The three LEDs were then sequentially turned on/off, and three sample images were thereby obtained with the newly captured aerosol particles. These background images and sample images were both transferred or synced to the server for further processing. The synching operation involves transferring the image files as well as updating a log file in the server that is sued for debugging and display purposes. In this approach, two sets of images (i.e., before and after sampling) were obtained to employ a differential imaging strategy. Specifically, after subtraction of the sample image from its corresponding background image, a differential hologram was formed, which contained the information of only the newly captured particles. For particle sizing, only the images captured under the green LED illumination were used. By merging all the differential holographic images captured using the three LEDs, red; green; blue (RGB) color images of the captured particles could also be obtained, revealing the color information of the specimen, if desired. This may be used, for example, to discern particle type or other particle-specific information, for example. However, in some embodiments where only particle counting and sizing is performed, only a single color illumination is needed. To avoid awaiting completion of the steps before a new sample could be obtained, the sampling process was programmed using a parallel approach. Accordingly, when a new sampling request arrived before the previous result was synced; the un-synced sample was cached first. It was later synced when the device became idle. In this embodiment, the entire device sampling process was controlled by a custom-developed program on a microcomputer (Raspberry Pi A+). Of course, different microcomputers or microprocessors may be used to control operation of the device as well as acquire images using the imaging array.

c-Air Smartphone App

To control the c-Air device, an iOS-based app was developed using Swift (Apple Inc.). Of course, the application or app could work on another operating system such as, for example, Android. The app is installed on an iOS device (e.g., iPhone 6s) and is used together with the c-Air device. The app has two basic functions: (1) controlling the device for sampling air; and (2) displaying the results processed by the server. The app may also facilitate the transfer of images and data to and from the remote server. In one embodiment, the app automatically establishes a personal hotspot upon launching, to which the device connects through Wi-Fi. FIG. 6 presents exemplary screen shots of the c-Air app user interface. After the user launches the c-Air app, a welcome screen is presented with the following options: "measure air quality," "view data," "device," and "about." The "measure air quality" option switches the app to the measurement screen with a logo of the device in the middle. Selecting the logo triggers the air sampling process, as shown in FIG. 7, and the global positioning system (GPS) coordinates of the Smartphone are recorded (so as to associate a particular sample with a specific geographic coordinate location). After the air sampling process is complete, the lens-free holographic images obtained by the sampler are labeled with the GPS coordinates from the Smartphone and transferred to a remote server for further processing. The app is designed to pair one Smartphone to one c-Air device. This pairing may be done using, for example, Bluetooth. To change the device that the app controls, the user can navigate to the screen (ii) and enter the IP address of the new sampler (or the IP address may be found automatically).

The same app is additionally used to view the server-processed results of the air samples (i.e., the results of processed holographic images obtained using the device) captured from different locations. The full history of the samples obtained by this device can be accessed in (iv) "map view" or (vi) "list view." Selecting a sample in "list view" or a pinpoint in "map view" creates a summary of the server-processed results. The results can be viewed in two aspects using the app: a reconstructed microscopic image of the captured aerosols on the substrate, with an option to zoom into individual particles, and a histogram of the particle size and density distribution (panel image (v) of FIG. 6).

Remote Processing of c-Air Images

Processing of the captured holographic c-Air images was performed on a Linux-based server (Intel Xeon ES-1630 3.70-GHz quad-core central processing unit, CPU) running Matlab. Of course, other computing devices (e.g., servers) containing the software thereon may also be used. As illustrated in FIG. 7, the computing device 52 (e.g., server) processes the captured lens-free holographic images in the following steps: (1) It receives two sets of holograms (background and sample); (2) Pre-processing of these images is performed, and a differential hologram is obtained; (3) After holographic reconstruction of the resulting differential hologram, particle detection is conducted using particle peeling and machine learning algorithms, which are detailed below; (4) The detected particles are sized, and the particle size statistics are generated; (5) The reconstructed images and the processed PM statistics are transferred back to the Smartphone app for visualization by the user.

In Step 1, the raw holograms, each approximately 5 MB in size, are transferred from the microscope device to the server at 1 s or less per image using Wi-Fi. In Step 5, the processed information is packaged as a JPEG file of the reconstructed image plus a vector containing the particle density of each size range, which is later rendered and displayed as a histogram on the Smartphone app. The specific algorithms used in this workflow are detailed below.

Pre-Processing and Differential Hologram Formation

The server receives the two sets of holograms (background and sample) in three colors: red (R), green (G), and blue (B). For pre-processing before the hologram reconstruction and particle detection steps, the raw format images were first extracted, which are then de-Bayered, i.e., only the information of the corresponding color channel is maintained. Next, to isolate the current aerosol sample collected during the latest sampling period, three differential holograms in R, G, and B are generated by digitally subtracting the corresponding background image from the sample image and normalizing it to a range of zero to two with a background mean centered at one. Alternatively, de-Bayering may take place after the differential holograms are obtained.

Holographic Reconstruction

A 2D distribution of captured particles, O(x, y), can be reconstructed through digital propagation of its measured hologram, A(x, y), to the image plane using the angular spectrum method:[29]

$$O(x,y) = F^{-1}\{F\{A(x,y)\} \cdot H(f_x, f_y)\} \quad (9)$$

where F and $F^{-1}$ define the spatial Fourier transform and its inverse, respectively, and $H(f_x, f_y)$ is the propagation kernel (i.e., the angular spectrum) in the Fourier domain, which is defined as:

$$H(f_x, f_y; \lambda, n, z) = \begin{cases} \exp\left[-j2\pi \frac{nz}{\lambda} \cdot \sqrt{1 - \left(\frac{\lambda}{n} \cdot f_x\right)^2 - \left(\frac{\lambda}{n} \cdot f_y\right)^2}\right] & \text{if } f_x^2 + f_y^2 \leq \left(\frac{n}{\lambda}\right)^2 \\ 0 & \text{otherwise} \end{cases} \quad (10)$$

where $f_x$ and $f_y$ represent the spatial frequencies of the image in the Fourier domain. The propagation kernel $H(f_x, f_y)$ is uniquely defined, given the illumination wavelength $\lambda$, refractive index of the medium, n, and the propagation distance z. Without further clarification, all the propagation-related terms herein refer to this angular-spectrum-based digital propagation of a complex object. Twin-image-related spatial artifacts due to intensity-only detection are discussed in the following subsections.

Digital Auto-Focusing on Aerosols

In the lens-free on-chip imaging geometry, the specific distance from the sample to the sensor plane is usually unknown and must be digitally estimated for accurate reconstruction and particle analysis. Here, a digital measure was used, termed the Tamura coefficient, for autofocusing and estimation of the vertical distance, z, from the particle to the sensor plane. See Memmolo, P. et al. Automatic focusing in digital holography and its application to stretched holograms. *Opt. Lett.* 36, 1945-1947 (2011), which is incorporated herein by reference. It is defined as the square root of the standard deviation of an image over its mean:

$$T(I_z) = \sqrt{\frac{\sigma(I_z)}{\langle I_z \rangle}} \quad (11)$$

where $I_z$ is the intensity image of a hologram after propagation by distance z.

Figure 15:
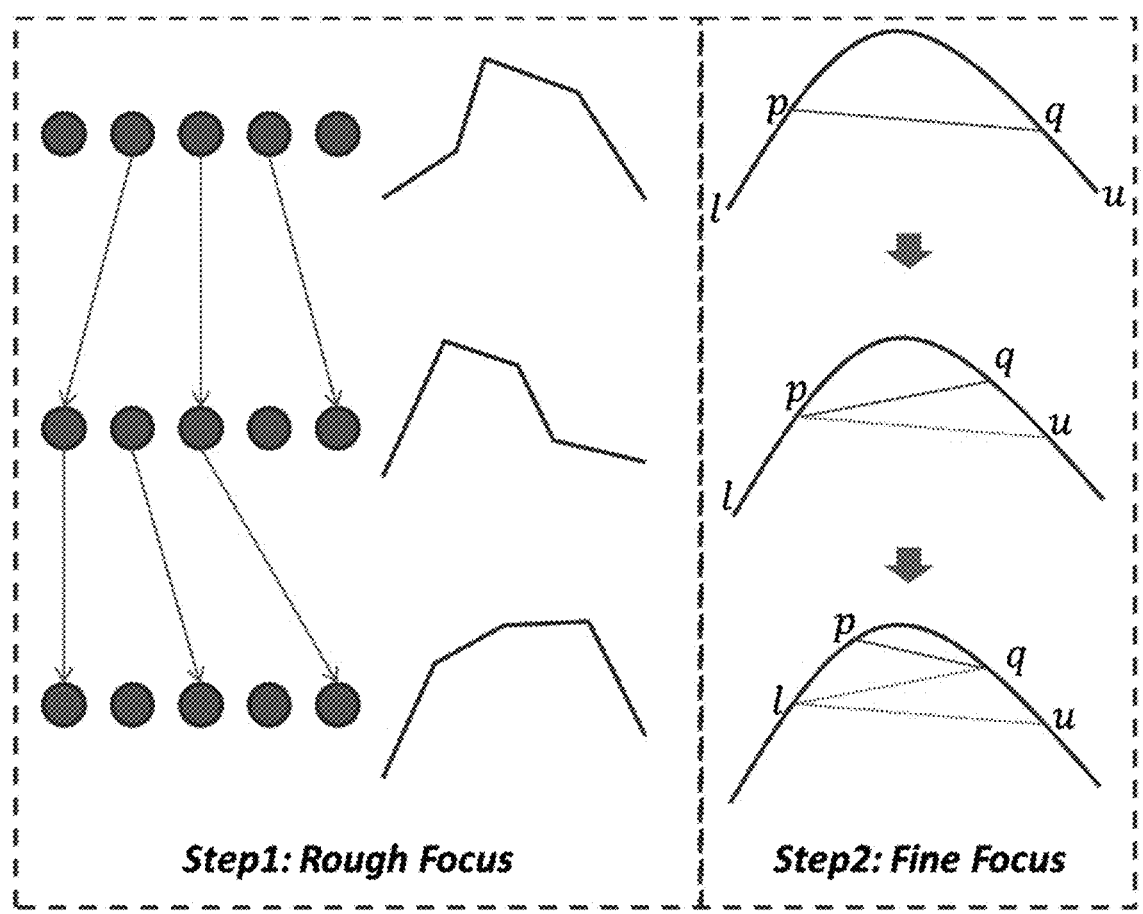
FIG. 15 illustrates the auto-focusing fast search algorithm used according to one embodiment.

For speeding up this auto-focusing process, a fast searching algorithm was used based on the Tamura coefficient, which is illustrated in FIG. 15. This searching method consists of two steps: finding a concave region around the Tamura coefficient peak, and performing a refined search in the concave region. In the first step, for an initial height interval of $(l_0, u_0)$, the hologram is propagated to 4N+1 equally spaced vertical distances between $l_0$ and $u_0$. The corresponding Tamura coefficients at these heights are then measured. At this point, one checks if the Tamura coefficient curve formed by these 4N+1 points is concave. If it is not, the peak location is determined and the 2N points around the peak are retained. Next, add 2N new points are then uniformly added in the middle of the intervals defined by these 2N+1 points. The overall height interval that is searched is decreased by one-half in each step. This process is repeated until a concave height interval, (l, u), is identified.

In the second step, after a concave height interval (l, u) is identified, a golden-ratio search is run to find the correct depth focus for each particle. To this end, the golden ratio is defined as $\alpha=(\sqrt{5}-1)/2$ where $p=u-\alpha(u-l)$ and $q=l+\alpha(u-l)$ is the golden-ratio division point on each side of a given height interval. After propagating the hologram to these new heights (p and q), one compares the Tamura coefficient, $T_p$ and $T_q$, at these two heights, p and q, respectively. If $T_p<T_q$, one moves the lower bound, l=p, and then let p=q, $T_p=T_q$, $q=l+\alpha(u-l)$. Otherwise, one moves the upper bound, u=q, and then let q=p, $T_q=T_p$, and $p=u-\alpha(u-l)$. This process is repeated until the length of the height interval is smaller than a predefined threshold, $u-l<\delta$, e.g., $\delta=0.1$ μm.

Particle Detection Using Digital "Peeling"

Direct back-propagation of the acquired hologram using Equation (9) to the auto-focused sample plane generates a spatial artifact, called the twin-image noise, on top of the object. This twin-image artifact affects the detection of aerosol particles. If left unprocessed, it can lead to false-positives and false-negatives. To address this problem, an iterative particle peeling algorithm is employed in the holographic reconstruction process. Additional details regarding digital peeling (or count-and-clean) may be found in McLeod, E. et al., High-throughput and label-free single nanoparticle sizing based on time-resolved on-chip microscopy, *ACS Nano* 9, 3265-3273 (2015), which is incorporated herein by reference. It is additionally combined with a machine learning algorithm or model to further reject these spatial artifacts. The machine learning algorithm may include a support vector machine (SVM)-based learning model, deep learning model, or the like known to those skilled in the art. The algorithm used according to one embodiment is summarized in FIG. 8.

This peeling algorithm contains four cycles of detection and erasing ("peeling out") of the particles at progressively increasing thresholds, i.e., 0.75, 0.85, 0.92, and 0.97, where the background is centered at 1.0 during the differential imaging process, as described in previous sections. The highest threshold (0.97) is selected as 3σ from the background mean, where a 0.01 is the standard deviation of the background. A morphological reconstruction process is used to generate the image mask instead of using a simple threshold. Because most particles have a darker center and a somewhat weaker boundary, using a single threshold may mask parts of the particle, potentially causing the particle to be missed or re-detected multiple times in subsequent peeling cycles. This is avoided by using a morphological reconstruction process.

In each cycle of this digital particle peeling process, one first adjusts the image focus using the auto-focusing algorithm described herein. Then, a morphological reconstruction is employed to generate a binary mask, where each masked area contains a particle. For each mask, a small image (100×100 pixels) is cropped and fine auto-focusing is performed on this small image to find the correct focus plane of the corresponding particle. At this focus plane, various spectral and spatial features of the particle are extracted, e.g., minimum intensity $I_m$, average intensity $I_a$, area A, and maximum phase $\theta_M$. The image is then propagated to five different planes uniformly spaced between 20 μm above and 20 μm below this focus plane. The Tamura coefficient of this focus plane is calculated and compared to the coefficients of these five other planes. The ratio of the Tamura coefficient at this focus plane against the highest Tamura coefficient of all six planes is defined as another feature, $R_{Tam}$. These four features, $I_m$, $\theta_M$, A, and $R_{Tam}$, are then fed into an SVM-based learning model to digitally separate spatial artifacts from true particles and reject such artifacts. This learning algorithm is detailed below. After all the detected particles in this peeling cycle are processed, one digitally peels out these "counted" particles, i.e., replace the thresholded area corresponding to each detected particle with the background mean, on both the image and twin image planes. The algorithm proceeds to the next peeling cycle with a higher threshold and repeat the same steps.

After completing all four peeling cycles, the extracted features, $I_m$, $\theta_M$, and A, are further utilized for particle sizing using a machine-learning algorithm, as detailed further below. This sizing process is only performed on true particles, which generates a histogram of particle sizes and density distributions, as well as various other parameters, including, for example, TSP, PM10, and PM2.5, reported as part of c-Air result summary.

Elimination of False-Positives Using a Trained Support Vector Machine

To avoid false-positives in the detection system, used a trained linear SVM was used that is based on four features, $I_m$, $\theta_M$, A, and $R_{Tam}$, as described previously, to distinguish spatial artifacts from true particles and increase c-Air detection accuracy. These spectral and spatial features were selected to provide the best separation between the true- and false-particles. To train this model, two air sample images were obtained using a c-Air prototype, one indoor and one outdoor. Then, in addition to the c-Air based analysis, the sampling coverslip was removed and inspected for the captured particles under a benchtop bright-field microscope using a 40× objective lens. The thresholded areas in the peeling cycle and lens-free reconstruction process were compared with the images of the benchtop microscope to mark each one of these detected areas as a true particle or a false one. Using this comparison, a total of more than 2,000 thresholded areas were labeled and half of this training data was fed into the SVM model (implemented in Matlab using the function "svmtrain"). The other half was used for blind testing of the model, which showed a precision of 0.95 and a recall of 0.98.

Detection and Exclusion of Moved Particles

Multiple differential imaging experiments were performed on the same substrate. It was observed that a small number of aerosol particles (~3%) moved or changed their positions on the substrate in the later runs. In the reconstruction of the differential hologram, the moved particle appears as a pair of white-black points, where the "white" particle appears because it was present in the previous image but is absent in the current one. To avoid over-counting the aerosols on account of these moved particles, a threshold-based algorithm was used as part of the four peeling cycles to detect these "white" particles. Then, the nearest black particles that were similar in size and intensity to the detected white particles were marked to define a "moved particle". The moved particle was then removed from the total particle density distribution, thereby avoiding double counting of the same particle.

Converting Particle Count to Particle Density

For each sample (and the corresponding c-Air differential hologram), the particle detection and sizing algorithm, as previously described, provides the particle count in the number of particles for different sizes/diameters. To facilitate a more universal unit, the sampling particle count, $N_i$, was converted to particle density $n_i$ (in counts/L) using the following equation:

$$n_i = \frac{N_i}{Q \cdot t} \cdot \frac{L_{sensor}}{L_{total}} \quad (12)$$

where Q=13 L/min is the flow rate of air, and t=0.5 min is the typical sampling duration. In addition, $L_{total}$=15.5 mm is the total length of the impactor nozzle slit, and $L_{sensor}$=3.67 mm is the part of the slit being imaged, which equals the longer edge of the CMOS sensor active area. The conversion equation here assumes that the particle distribution is uniform along the sampler nozzle length, which is a valid assumption because the nozzle tapering is in its orthogonal direction, while the structure of the sampler in this direction is spatially invariant.

The c-Air system provides a lens-free microscope device together with the use of machine learning to provide a platform that is portable and cost-effective for PM imaging, sizing, and quantification. The platform uses a field-portable device weighing approximately 590 grams, a Smartphone app for device control and display of results, and a remote server (or other computing device 52) for the automated processing of digital holographic microscope images for PM measurements based on a custom-developed machine learning algorithm. The performance of the device was validated by measuring air quality at various indoor and outdoor locations, including an EPA-regulated air sampling station, where a comparison of c-Air results with those of an EPA-approved BAM device showed a close correlation. The c-Air platform was used for spatio-temporal mapping of air-quality near LAX, which showed the PM concentration varying throughout the day in accordance with the total number of flights at LAX. The strength of this correlation, as well as the daily average PM, exponentially decreased as a function of the increasing distance from LAX. The c-Air platform, with its microscopic imaging and machine learning interface, has a wide range of applications in air quality regulation and improvement.

While embodiments of the present invention have been shown and described, various modifications may be made without departing from the scope of the present invention. The invention, therefore, should not be limited, except to the following claims, and their equivalents.

What is claimed is:

1. A system comprising a portable, lens-free microscope device for monitoring air quality, the system comprising:
   a housing;
   a pump configured to draw air into an impaction nozzle disposed in the housing, the impaction nozzle having an output located adjacent to an optically transparent substrate having a sticky or tacky material thereon for collecting particles contained in the air;
   one or more illumination sources disposed in the housing and configured to illuminate the collected particles on the optically transparent substrate;
   an image sensor disposed in the housing and located adjacent to the optically transparent substrate at a distance of less than 5 mm, wherein the image sensor collects diffraction patterns or holographic images cast upon the image sensor by the collected particles; and
   at least one processor disposed in the housing, the at least one processor controlling the pump and/or the one or more illumination sources; and
   a computing device configured to execute software thereon for receiving a diffraction patterns or holographic images from the image sensor and reconstructing differential holographic images containing phase and/or amplitude information of the collected particles and outputting particle images and one or more of particle size data, particle density data, or particle type data of the collected particles based on a machine learning algorithm in the software using extracted spectral and/or spatial features comprising one or more of minimum intensity ($I_m$), average intensity ($I_a$), maximum intensity, standard deviation of intensity, area (A), maximum phase, minimum phase, average phase, standard deviation of phase, eccentricity of intensity, and eccentricity of phase.

2. The system of claim 1, wherein the computing device comprises one of a local computing device or a remote computing device.

3. The system of claim 2, wherein the remote computing device comprises a server.

4. The system of claim 1, wherein the diffraction patterns or holographic images are labeled with a spatial and temporal data related to the sampled air.

5. The system of claim 1, wherein the extracted spectral and spatial features are obtained at different illumination wavelengths.

6. The system of claim 1, wherein the particle type data comprises particle type comprising one or more of bacteria, viruses, pollen, spores, molds, biological particles, soot, inorganic particles, and organic particles.

7. The system of claim 1, wherein the software executed by the computing device is configured to eliminate artifacts using a trained machine learning algorithm based on the extracted spectral and spatial features.

8. The system of claim 1, wherein the software executed by the computing device is configured to execute a digital peeling process to identify and eliminate spatial artifacts or false positives.

9. The system of claim 1, wherein each holographic image is associated with a GPS location and time/date stamp.

10. The system of claim 1, further comprising a portable electronic device containing software and/or an application thereon configured to receive the particle images and particle size data, particle density data, or particle type data of the collected particles and output the same to the user on a user interface.

11. The system of claim 10, wherein the user interface provides search functionality to search sampled air samples based on one or more of particle size, particle density, particle type, sample location, sample date or time.

12. A method of monitoring air quality using a portable microscope device comprising:
   activating a pump disposed in the portable microscope device to capture aerosol particles on an optically transparent substrate;
   illuminating the optically transparent substrate containing the captured aerosol particles with one or more illumination sources contained in the portable microscope device;
   capturing casted before and after holographic images or diffraction patterns of the captured aerosol particles with an image sensor disposed in the portable microscope device and disposed adjacent to the optically transparent substrate, wherein the before holographic images or diffraction patterns are obtained prior to capture of the aerosol particles and the after holographic images or diffraction patterns are obtained after capture of the aerosol particles;

transferring the image files containing the holographic images or diffraction patterns to a computing device;

processing the image files containing the before and after holographic images or diffraction patterns with software contained on the computing device to generate a differential hologram or diffraction pattern followed by outputting a holographic image reconstruction and one or more of particle size data, particle density data, or particle type data of the captured aerosol particles.

13. The method of claim 12, wherein the software executed by the computing device outputs one or more of the particle size data, particle density data, or particle type data based on a machine learning algorithm in the software using extracted spectral and spatial features comprising one or more of minimum intensity ($I_m$) average intensity ($I_a$), maximum intensity, standard deviation of intensity, area (A), maximum phase, minimum phase, average phase, standard deviation of phase, eccentricity of intensity, and eccentricity of phase.

14. The method of claim 12, further comprising transferring one or more of particle images, particle size data, particle density data, or particle type data to a portable electronic device for display thereon.

15. The method of claim 12, wherein the portable electronic device comprises a smartphone or tablet computer having an application loaded thereon for displaying one or more of the particle size data, particle density data, or particle type data using a graphical user interface.

* * * * *